(12) United States Patent
Thimmel et al.

(10) Patent No.: US 8,365,200 B1
(45) Date of Patent: Jan. 29, 2013

(54) USING CANCELLATION STATUS MODELS IN A COMPUTER SYSTEM

(75) Inventors: Bernhard Thimmel, Edingen-Neckarhausen (DE); Frank Michael Kraft, Speyer (DE); Jacques Duparc, Speyer (DE)

(73) Assignee: SAP AG, Walldorf (DE)

( * ) Notice: Subject to any disclaimer, the term of this patent is extended or adjusted under 35 U.S.C. 154(b) by 657 days.

(21) Appl. No.: 12/571,759

(22) Filed: Oct. 1, 2009

Related U.S. Application Data

(63) Continuation-in-part of application No. 11/617,464, filed on Dec. 28, 2006, now Pat. No. 8,122,063, which is a continuation-in-part of application No. 11/477,787, filed on Jun. 30, 2006.

(60) Provisional application No. 61/102,292, filed on Oct. 2, 2008.

(51) Int. Cl.
G06F 3/00 (2006.01)
G06F 9/44 (2006.01)
G06F 9/46 (2006.01)
G06F 13/00 (2006.01)

(52) U.S. Cl. .................. 719/320; 719/316; 707/999.103

(58) Field of Classification Search .................. 719/319, 719/320; 707/101, 103
See application file for complete search history.

(56) References Cited

U.S. PATENT DOCUMENTS

| | | | |
|---|---|---|---|
| 5,212,792 A | 5/1993 | Gerety et al. | |
| 5,295,222 A | 3/1994 | Wadhwa et al. | |
| 5,404,496 A | 4/1995 | Burroughs et al. | |
| 5,555,415 A | 9/1996 | Allen | |
| 5,652,714 A | 7/1997 | Peterson et al. | |
| 5,671,360 A | 9/1997 | Hambrick et al. | |
| 5,758,029 A | 5/1998 | Hall | |
| 5,781,545 A | 7/1998 | Matthew | |
| 5,801,687 A | 9/1998 | Peterson et al. | |
| 5,890,146 A | 3/1999 | Wavish et al. | |
| 5,920,718 A | 7/1999 | Uczekaj et al. | |
| 5,983,016 A | 11/1999 | Brodsky et al. | |
| 5,991,733 A | 11/1999 | Aleia et al. | |
| 6,078,325 A | 6/2000 | Jolissaint et al. | |
| 6,151,023 A | 11/2000 | Chari | |
| 6,175,837 B1 | 1/2001 | Sharma et al. | |
| 6,182,277 B1 | 1/2001 | DeGroot | |
| 6,308,224 B1 | 10/2001 | Leymann et al. | |
| 6,324,496 B1 | 11/2001 | Alur et al. | |
| 6,408,262 B1 | 6/2002 | Leerberg et al. | |
| 6,442,515 B1 | 8/2002 | Varma et al. | |
| 6,480,955 B1 | 11/2002 | DeKoning et al. | |
| 6,553,403 B1 | 4/2003 | Jarriel et al. | |

(Continued)

FOREIGN PATENT DOCUMENTS

EP 1 674 990 6/2006
WO 2005/117549 12/2005

OTHER PUBLICATIONS

U.S. Appl. No. 11/477,787, Meyer et al., filed Jun. 30, 2006.

(Continued)

*Primary Examiner* — Diem Cao
(74) *Attorney, Agent, or Firm* — Fish & Richardson P.C.

(57) ABSTRACT

A computer system, in which cancellation status models are used. The computer system receives a request to cancel a parent data object node instance and accesses a first cancellation building block that models a first cancellation subprocess for the first type of data object node and that is integrated in a first status schema defined for the first type of data object node. The computer system executes cancellation of the parent data object node instance by accessing data that indicates whether or not a child data object node instance is able to be cancelled and conditioning cancellation of the parent data object node instance on the accessed data indicating that the child data object node instance is able to be cancelled.

20 Claims, 22 Drawing Sheets

U.S. PATENT DOCUMENTS

| | | | |
|---|---|---|---|
| 6,681,383 | B1 | 1/2004 | Pastor et al. |
| 6,760,733 | B1 * | 7/2004 | Komine et al. ............ 1/1 |
| 6,769,048 | B2 | 7/2004 | Goldberg et al. |
| 6,772,036 | B2 | 8/2004 | Eryurek et al. |
| 6,973,460 | B1 * | 12/2005 | Mitra ........................ 1/1 |
| 7,117,293 | B1 | 10/2006 | Graziano et al. |
| 7,120,896 | B2 | 10/2006 | Budhiraja et al. |
| 7,191,149 | B1 | 3/2007 | Lanham et al. |
| 7,451,447 | B1 | 11/2008 | Deshpande |
| 7,577,681 | B1 * | 8/2009 | Rozenman et al. ............ 1/1 |
| 7,606,791 | B2 | 10/2009 | Dettinger et al. |
| 7,613,993 | B1 | 11/2009 | Baer et al. |
| 7,761,337 | B2 | 7/2010 | Caballero et al. |
| 7,945,594 | B2 | 5/2011 | Thimmel et al. |
| 7,966,621 | B2 | 6/2011 | Kraft et al. |
| 8,020,172 | B2 | 9/2011 | Kraft et al. |
| 8,055,527 | B1 | 11/2011 | Gil et al. |
| 2002/0013777 | A1 | 1/2002 | Diener |
| 2002/0038206 | A1 | 3/2002 | Dori |
| 2002/0062475 | A1 | 5/2002 | Iborra et al. |
| 2002/0083413 | A1 | 6/2002 | Kodosky et al. |
| 2002/0138290 | A1 | 9/2002 | Metcalfe et al. |
| 2002/0152102 | A1 | 10/2002 | Brodersen et al. |
| 2002/0167544 | A1 | 11/2002 | Raghavan et al. |
| 2002/0194388 | A1 | 12/2002 | Boloker et al. |
| 2003/0018461 | A1 | 1/2003 | Beer et al. |
| 2003/0018508 | A1 | 1/2003 | Schwanke |
| 2003/0028858 | A1 | 2/2003 | Hines |
| 2003/0046658 | A1 | 3/2003 | Raghavan et al. |
| 2003/0050813 | A1 | 3/2003 | Cohen et al. |
| 2003/0074090 | A1 | 4/2003 | Becka et al. |
| 2003/0074371 | A1 * | 4/2003 | Park et al. ............ 707/103 R |
| 2003/0195789 | A1 | 10/2003 | Yen |
| 2004/0027388 | A1 | 2/2004 | Berg et al. |
| 2004/0049436 | A1 | 3/2004 | Brand et al. |
| 2004/0059808 | A1 | 3/2004 | Galloway et al. |
| 2004/0078258 | A1 | 4/2004 | Schulz et al. |
| 2004/0083448 | A1 | 4/2004 | Schulz et al. |
| 2004/0119752 | A1 | 6/2004 | Beringer et al. |
| 2004/0139104 | A1 | 7/2004 | Kuntz-Mayr et al. |
| 2004/0181775 | A1 | 9/2004 | Anonsen et al. |
| 2004/0193510 | A1 * | 9/2004 | Catahan et al. ............ 705/28 |
| 2004/0220956 | A1 * | 11/2004 | Dillon ............ 707/101 |
| 2004/0225919 | A1 | 11/2004 | Reissman et al. |
| 2004/0233232 | A1 | 11/2004 | Iborra et al. |
| 2005/0004888 | A1 | 1/2005 | McCrady et al. |
| 2005/0004951 | A1 | 1/2005 | Ciaramitaro et al. |
| 2005/0010504 | A1 | 1/2005 | Gebhard et al. |
| 2005/0027811 | A1 | 2/2005 | Kraft |
| 2005/0137928 | A1 | 6/2005 | Scholl et al. |
| 2005/0256665 | A1 | 11/2005 | Hartmann et al. |
| 2006/0069605 | A1 | 3/2006 | Hatoun |
| 2006/0085681 | A1 | 4/2006 | Feldstein et al. |
| 2006/0095439 | A1 | 5/2006 | Buchmann et al. |
| 2006/0136923 | A1 | 6/2006 | Kahn et al. |
| 2006/0179383 | A1 | 8/2006 | Blass et al. |
| 2006/0227350 | A1 | 10/2006 | Crawford et al. |
| 2006/0265691 | A1 | 11/2006 | Klinger et al. |
| 2006/0294158 | A1 | 12/2006 | Tsyganskiy et al. |
| 2007/0142935 | A1 | 6/2007 | Danielsson et al. |
| 2007/0156427 | A1 | 7/2007 | Dentzer et al. |
| 2007/0226025 | A1 | 9/2007 | Chang et al. |
| 2007/0282570 | A1 | 12/2007 | Thompson et al. |
| 2007/0282916 | A1 * | 12/2007 | Albahari et al. ............ 707/200 |
| 2008/0005061 | A1 | 1/2008 | Kraft |
| 2008/0005152 | A1 | 1/2008 | Kraft |
| 2008/0005153 | A1 | 1/2008 | Kraft |
| 2008/0005162 | A1 | 1/2008 | Kraft |
| 2008/0005625 | A1 | 1/2008 | Kraft |
| 2008/0005739 | A1 | 1/2008 | Sadiq |
| 2008/0005743 | A1 | 1/2008 | Kraft |
| 2008/0005747 | A1 | 1/2008 | Meyer et al. |
| 2008/0015883 | A1 | 1/2008 | Hermann |
| 2008/0046862 | A1 | 2/2008 | Sattler et al. |
| 2008/0162672 | A1 | 7/2008 | Krasinskiy |
| 2009/0089309 | A1 | 4/2009 | Thimmel |

OTHER PUBLICATIONS

U.S. Appl. No. 11/617,462, Krasinskiy et al., filed Dec. 28, 2006.
U.S. Appl. No. 11/617,464, Kraft et al., filed Dec. 28, 2006.
U.S. Appl. No. 11/617,495, Kraft et al., filed Dec. 28, 2006.
U.S. Appl. No. 11/617,577, Kraft et al., filed Dec. 28, 2006.
U.S. Appl. No. 11/617,580, Kraft et al., filed Dec. 28, 2006.
U.S. Appl. No. 11/617,616, Kraft et al., filed Dec. 28, 2006.
U.S. Appl. No. 11/617,638, Kraft et al., filed Dec. 28, 2006.
U.S. Appl. No. 11/617,647, Kraft et al., filed Dec. 28, 2006.
U.S. Appl. No. 11/862,813, Thimmel, filed Sep. 27, 2007.
U.S. Appl. No. 12/020,984, Thimmel et al., filed Jan. 28, 2008.
U.S. Appl. No. 12/102,548, Kraft et al., filed Apr. 14, 2008.
U.S. Appl. No. 12/333,197, Manu et al., filed Dec. 11, 2008.
U.S. Appl. No. 12/634,834, Kraft et al., filed Dec. 10, 2009.
U.S. Appl. No. 12/634,996, Kraft et al., filed Dec. 10, 2009.
'Introduction to OMG's Unified Modeling Language™ (UML ®)' [online]. Object Management Group, 2005 [retrieved on Nov. 26, 2006]. Retrieved from the Internet: <URL: omg.org/gettingstarted/what_is_uml.htm>, 16 pages.
'Status Management [online]. SAP, [retrieved on Nov. 27, 2006]. Retrieved from the Internet: <URL: help.sap.com/saphelp_47x200/helpdata/en/f0/ca3965260211d28a430000e829fbbd/content.htm>, 1 page.
'Status Management' [online]. SAP, [retrieved on Nov. 27, 2006]. Retrieved from the Internet: <URL: help.sap.com/saphelp_47x200/helpdata/en/ee/41f79346ee11d189470000e829fbbd/content.htm>, 2 pages.
'Unified Modeling Language: Superstructure Version 2.0' [online]. Object Management Group, 2005, [retrieved on Nov. 27, 2006]. Retrieved from the Internet: <URL: www.omg.org/docs/formal/05-07-04.pdf>, pp. 8-12.
'User Status' [online]. SAP, [retrieved on Nov. 27, 2006]. Retrieved from the Internet: <URL: help.sap.com/saphelp_47x200/helpdata/en/f0/ca39a6260211d28a430000e829fbbd/content.htm>, 1 page.
'Workflow Management Coalition The Workflow Reference Model' [online]. Workflow Management Coalition, 1995, [retrieved on Nov. 27, 2006]. Retrieved from the Internet: <URL: www.wfmc.org/standards/docs/tc003v11.pdf>, 55 pages.
"Business Process Modeling Notation Specification", Final Adopted Specification, dtc/Feb. 1, 2006, Object Management Group, Feb. 2006.
"Object Constraint Language", OMG Available Specification, Version 2.0, formal/May 1, 2006, Object Management Group, May 2006.
"Unified Modeling Language: Infrastructure", Version 2.1.1 (without change bars), formal/Feb. 6, 2007, Object Management Group, Feb. 2007.
"Unified Modeling Language: Superstructure", Version 2.0, formal/Jul. 4, 2005, Object Management Group, Aug. 2005.
"Unified Modeling Language: Superstructure", Version 2.1.1 (non-change bar), formal/Feb. 5, 2007, Object Management Group, Feb. 2007.
Baldan et al., "Functorial Concurrent Semantics for Petri Nets and Read and Inhibitor Arcs", Lecture Notes in Computer Science, vol. 1877, Proceedings of the 11th International Conference on Concurrency Theory, Springer-Verlag, 2000.
Beugnard et al., "Making Components Contract Aware", IEEE Computer Society, Jul. 1999, pp. 38-45.
Eric Armstrong, "*How to implement state-dependent behavior—Doing the State pattern in Java*," internet citation, XP002246628 ISSN: 1091-8906, Retrieved from the internet: http://222.javaworld.com/javaworld/jw-08-1997/jw-08-stated_p.html, retrieved on Jul. 7, 2007.
Extended European Search Report issued in 07025131.9-1243 / 1939744 on Aug. 19, 2009.
Holger Giese, "Object-Oriented Design and Architecture of Distributed Systems", Inaugural-Dissertation, Department of Mathematics and Computer Science, Faculty of Mathematics and Natural Science, Westfälischen Wilhelms-Universität Münster, for the degree of Doctor of Science, Feb. 2001.

International Search Report and Written Opinion of the International Searching Authority issued in PCT/EP2007/005779 on Dec. 30, 2008.
International Search Report and Written Opinion of the International Searching Authority issued in PCT/EP2007/005781 on Dec. 30, 2008.
International Search Report and Written Opinion of the International Searching Authority issued in PCT/EP2007/005782 on Dec. 30, 2008.
International Search Report and Written Opinion of the International Searching Authority issued in PCT/EP2007/005783 on Jan. 7, 2009.
'Introduction to OMG's Unified Modeling Language™ (UML®)' [online]. Object Management Group, 2005 [retrieved on Nov. 26, 2006]. Retrieved from the Internet: <URL: omg.org/gettingstarted/what_is_uml.htm>, 16 pages.
International Search Report and Written Opinion of the International Searching Authority issued in PCT/EP2007/005784 on Dec. 29, 2008.
International Search Report and Written Opinion of the International Searching Authority issued in PCT/EP2007/005786 on Jan. 8, 2009.
International Search Report and Written Opinion of the International Searching Authority issued on Nov. 30, 2007, in corresponding application PCT/ EP2007/005785.
Jason Zhicheng Li, "*Business Object State Management Using State Machine Compiler*," Internet Citation, May 1, 2006 (May 2, 2006), XP002396380, Retrieved from the internet: http://today.java.ne/pub/a/today/2006/01/05/business-object-state_management-using-smc.html, retrieved Aug. 24, 2006.
Kiczales, Gregor et al., "An Overview of AspectJ," Lecture notes in Computer Science, Springer Verlag, Berlin, Germany, vol. 2072, Jun. 18, 2001, pp. 327-353.
Kraft et al., U.S. Appl. No. 12/102,548, filed Apr. 14, 2008.
Kraft et al., U.S. Appl. No. 12/634,834, filed Dec. 10, 2009.
Kraft et al., U.S. Appl. No. 12/634,996, filed Dec. 10, 2009.
Leavens, Gary T. et al., "Preliminary Design of JML: A Behavioral Interface Specification Language of Java," ACM SIGSOFT Software Engineering Notes, vol. 31, No. 3, May 2006, pp. 1-38.
Lohman et al., "Behavioral Contraints for Services", Business Process Management, 5$^{th}$ International Conference, BPM, 2007, Brisbane, Australia.
Non-Final Office Action issued in U.S. Appl. No. 11/617,462 on Nov. 20, 2009.
Non-Final Office Action issued in U.S. Appl. No. 11/862,813 on Nov. 25, 2009.
S. Christensen and N. Hansen, "Coloured Petri Nets Extended with Place Capacities, Test Arcs and Inhibitor Arcs", Lecture Notes in Computer Science, vol. 691, Proceedings of the 14$^{th}$ International Conference on Application and Theory of Petri Nets, Springer-Verlag, 1993.
S. Stelting et al., "Applied Java Patterns" (Online), Dec. 26, 2001, Prentice Hall, retrieved from the internet: http://proquest.safaribooksonline.com/0130935387?tocview=true>, retrieved Aug. 7, 2009).
Thimmel et al., U.S. Appl. No. 12/020,984, filed Jan. 28, 2008.
W.M.P. van der Aaslt and M. Pesic, "DecSerFlow: Towards a Truly Declarative Service Flow Language", in M. Bravetti, M. Nunez, and G. Zavattaro, editors, International Conference on Web Services and Formal Methods (WS-FM 2006), vol. 4184 of Lecture Notes in Computer Science, pp. 1-23, Springer-Verlag, Berlin, 2006.
Wirtz et al., "The OCoN Approach to Workflow Modeling in Object-Oriented Systems", Information Systems Frontiers 3:3, 357-376, 2001.
Non-Final Office Action issued in U.S. Appl. No. 11/477,787 on Dec. 29, 2009, 12 pages.
Final office action from U.S. Appl. No. 11/477,787 dated Jun. 24, 2010, 18 pages.
Non-Final Office Action issued in U.S. Appl. No. 11/617,580 on Dec. 30, 2009, 13 pages.
Merriam-Webster Online, "Programmatically—Definition and More from the Free Merriam Webster" downloaded Jun. 16, 2010, http://www.merriam-webster.com/dictionary/programmatically.
Office action from U.S. Appl. No. 11/617,577 dated Mar. 25, 2010, 21 pages.
Office action from U.S. Appl. No. 11/617,495 dated Mar. 18, 2010, 17 pages.
Final Office Action from U.S. Appl. No. 11/617,580 dated Jun. 24, 2010, 13 pages.
Office action from U.S. Appl. No. 11/617,616 dated Apr. 19, 2010, 15 pages.
Office action from U.S. Appl. No. 11/617,462 dated May 11, 2010, 23 pages.
Final Office Action from U.S. Appl. No. 11/862,813 dated Jun. 11, 2010, 7 pages.
Office action from U.S. Appl. No. 12/020,984 dated Apr. 12, 2010, 10 pages.
Final office action from U.S. Appl. No. 11/617,577, dated Aug. 25, 2010, 21 pages.
Final office action from U.S. Appl. No. 11/617,495, dated Aug. 25, 2010, 16 pages.
Office action from U.S. Appl. No. 11/617,464, dated Sep. 3, 2010, 14 pages.
Final office action from U.S. Appl. No. 12/020,984, dated Sep. 30, 2010, 17 pages.
Office action from U.S. Appl. No. 11/617,462, dated Nov. 1, 2010, 16 pages.
Office action from U.S. Appl. No. 11/617,647, dated Nov. 5, 2010, 26 pages.
Office action from U.S. Appl. No. 11/617,638, dated Sep. 30, 2010, 16 pages.
Office action from U.S. Appl. No. 11/617,464, dated Feb. 28, 2011, 14 pages.
Final office action from U.S. Appl. No. 11/617,647, dated Jul. 11, 2011, 26 pages.
Final office action from U.S. Appl. No. 11/617,462, dated Jul. 21, 2011, 19 pages.
Office action from U.S. Appl. No. 12/333,197, dated Oct. 14, 2011, 14 pages.
Office action from U.S. Appl. No. 12/634,834, dated Oct. 12, 2011, 17 pages.
Office action from U.S. Appl. No. 12/634,996, dated Sep. 8, 2011, 14 pages.
Office action from U.S. Appl. No. 11/617,580, dated Dec. 8, 2011, 37 pages.
Final office action from U.S. Appl. No. 12/634,996, dated Jan. 4, 2012, 9 pages.
Office action from U.S. Appl. No. 12/102,548, dated Jan. 12, 2012, 21 pages.
Final office action from U.S. Appl. No. 11/617,580, dated Jun. 15, 2012, 31 pages.
Final office action from U.S. Appl. No. 12/102,548, dated Jul. 12, 2012, 20 pages.
Final office action from U.S. Appl. No. 12/333,197, dated May 3, 2012, 14 pages.
Final office action from U.S. Appl. No. 12/634,834, dated Jun. 11, 2012, 19 pages.

\* cited by examiner

USING CANCELLATION STATUS MODELS IN A COMPUTER SYSTEM

CROSS-REFERENCE TO RELATED APPLICATIONS

This application claims the benefit of U.S. Provisional Application No. 61/102,292, filed Oct. 2, 2008. This application also is a continuation-in-part of U.S. application Ser. No. 11/617,464, filed Dec. 28, 2006 and titled USING STATUS MODELS IN A COMPUTER SYSTEM, now U.S. Pat. No. 8,122,063, which is a continuation-in-part of U.S. application Ser. No. 11/477,787, filed Jun. 30, 2006 and titled SYSTEM AND METHOD FOR OBJECT STATE MANAGEMENT. All of the prior applications are incorporated by reference.

TECHNICAL FIELD

This description generally relates to transaction processing performed by computer systems.

BACKGROUND

Software systems and components may be developed using object technology, and the operation of these systems and components may occur through methods that are performed on and/or by objects. An object's state may be said to include the combination of current attribute values of the object at a particular point in time. The execution of a method may change attribute values of an object, which, in turn, may lead to a new state of the object. Sometimes the current state of the object or computing environment may be an important factor in determining whether a particular action is allowed to be performed or not.

SUMMARY

In one aspect, a computer program product tangibly embodied in computer-readable medium includes instructions that, when executed, cause a runtime component to perform operations. The operations include receiving a request to cancel a parent data object node instance. The parent data object node instance is an instance of a first type of data object node and has a logical relationship to a child data object node instance. The operations also include, in response to the request to cancel the parent data object node instance, accessing, for the parent data object node instance, a first cancellation building block that models a first cancellation subprocess for the first type of data object node and that is integrated in a first status schema defined for the first type of data object node. The first cancellation building block includes a first cancellation status variable for the first type of data object node and a first cancellation action that defines the first cancellation subprocess for the first type of data object node. The operations further include executing cancellation of the parent data object node instance by accessing data that indicates whether or not the child data object node instance is able to be cancelled and, conditioned on the accessed data indicating that the child data object node instance is able to be cancelled, performing, for the parent data object node instance, the first cancellation action included in the first cancellation building block for the first type of data object node to update the first cancellation status variable included in the first cancellation building block.

Implementations may include one or more of the following features. For example, the operations may include declining the request to cancel the parent data object node instance conditioned on the accessed data indicating that the child data object node instance is not able to be cancelled. In this example, the first cancellation building block may include a cancellation-declined status variable for the first type of data object node and the operations may include updating the cancellation-declined status variable for the parent data object node instance to indicate that cancellation of the parent data object node instance was attempted and declined.

In some implementations, the operations may include sending, from the parent data object node instance to the child data object node instance, a message that asks whether the child data object node instance is able to be cancelled and receiving, at the parent data object node instance from the child data object node instance, a response that indicates whether or not the child data object node instance is able to be cancelled. In these implementations, performing, for the parent data object node instance, the first cancellation action is conditioned on the response indicating that the child data object node instance is able to be cancelled. Further, in these implementations, the operations may include sending, from the parent data object node instance to the child data object node instance, a request to invoke cancellation of the child data object node instance based on a determination that the response indicates that the child data object node instance is able to be cancelled.

In some examples, the operations may include sending, from the parent data object node instance to the child data object node instance, a request to invoke cancellation of the child data object node instance and receiving, at the parent data object node instance from the child data object node instance, a response that indicates whether or not the child data object node instance was cancelled in response to the request. In these examples, performing, for the parent data object node instance, the first cancellation action is conditioned on the response indicating that the child data object node instance was cancelled. Further, in these examples, the first cancellation building block may include a cancellation-requested status variable for the first type of data object node and the operation may include updating the cancellation-requested status variable for the parent data object node instance in response to sending the request to invoke cancellation of the child data object node instance.

In some implementations, the child data object node instance is an instance of a second type of data object node that is different than the first type of data object node. In these implementations, the operations may include accessing, for the child data object node instance, a second cancellation building block that models a second cancellation subprocess for the second type of data object node and that is integrated in a second status schema defined for the second type of data object node. The second cancellation building block may include a second cancellation status variable for the second type of data object node and a second cancellation action that defines the second cancellation subprocess for the second type of data object node. The operations also may include determining whether the child data object node instance is able to be cancelled using the second cancellation building block that models the second cancellation subprocess for the second type of data object node and that is integrated in the second status schema defined for the second type of data object node. The second cancellation building block may be a variant of the first cancellation building block or the second cancellation building block may be the same as the first cancellation building block.

In addition, the child data object node instance may have a logical relationship to a grandchild data object node instance and the grandchild data object node instance may be an instance of a third type of data object node that is different than the second type of data object node and the first type of data object node. The operations may include accessing information that indicates whether or not the grandchild data object node instance is able to be cancelled and determining that the child data object node instance is able to be cancelled is conditioned on the accessed information indicating that the grandchild data object node instance is able to be cancelled.

In some examples, the operations may include accessing, for the grandchild data object node instance, a third cancellation building block that models a third cancellation subprocess for the third type of data object node and that is integrated in a third status schema defined for the third type of data object node. The third cancellation building block may include a third cancellation status variable for the third type of data object node and a third cancellation action that defines the third cancellation subprocess for the third type of data object node. The third cancellation building block may be a variant of the first cancellation building block and the second cancellation building block. In these examples, the operations may include determining whether the grandchild data object node instance is able to be cancelled using the third cancellation building block that models the third cancellation subprocess for the third type of data object node and that is integrated in the third status schema defined for the third type of data object node.

Further, the child data object node instance may be an instance of the first type of data object node. The operations may include controlling actions of the parent data object node instance based on an updated value of the first cancellation status variable. The operations also may include using values of additional status variables defined by the first status schema as additional constraints on the first cancellation subprocess.

In some implementations, the first status schema may define preconditions to performing the first cancellation action. In these implementations, the operations may include evaluating the preconditions to performing the first cancellation action and performing, for the parent data object node instance, the first cancellation action conditioned on the evaluation of the preconditions revealing that cancellation is allowed for the parent data object node instance.

In some examples, the parent data object node instance may have a logical relationship to multiple child data object node instances. In these examples, the operations may include sending a request related to cancellation to each of the multiple child data object node instances, receiving, from each of the multiple child data object node instances, a response to the request related to cancellation, and aggregating the responses received from the multiple child data object node instances. Further, in these examples, performing, for the parent data object node instance, the first cancellation action is conditioned on the aggregated responses indicating that all of the multiple child data object node instances are able to be cancelled.

In another aspect, a computer-implemented method includes receiving a request to cancel a parent data object node instance. The parent data object node instance is an instance of a first type of data object node and has a logical relationship to a child data object node instance. The method also includes, in response to the request to cancel the parent data object node instance, accessing, for the parent data object node instance and from electronic storage, a first cancellation building block that models a first cancellation subprocess for the first type of data object node and that is integrated in a first status schema defined for the first type of data object node. The first cancellation building block includes a first cancellation status variable for the first type of data object node and a first cancellation action that defines the cancellation subprocess for the first type of data object node. The method further includes executing, by at least one processor, cancellation of the parent data object node instance by accessing data that indicates whether or not the child data object node instance is able to be cancelled and, conditioned on the accessed data indicating that the child data object node instance is able to be cancelled, performing, for the parent data object node instance, the first cancellation action included in the first cancellation building block for the first type of data object node to update the cancellation status variable included in the first cancellation building block.

In yet another aspect, a computer program product tangibly embodied in computer-readable medium includes instructions that, when executed, cause a runtime component to perform operations. The operations include receiving a request to cancel a first data object node instance. The first data object node instance is an instance of a first data object node. The operations also include determining whether a successor data object node instance exists for the first data object node instance and, in response to a determination that a successor data object node instance does not exist, performing a cancellation process for the first data object node instance. In response to a determination that a successor data object node instance exists, the method includes accessing data that indicates whether or not the successor data object node instance is able to be cancelled, performing a cancellation process for the first data object node instance conditioned on the accessed data indicating that the successor data object node instance is able to be cancelled, and declining the request to cancel the first data object node instance conditioned on the accessed data indicating that the successor data object node instance is not able to be cancelled.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

DETAILED DESCRIPTION

Techniques are provided that allow for the cancellation of an instance of a data object node in a less burdensome and more coherent manner. In computer systems, a process often leads to a chain of objects that participate in the process and exchange messages to facilitate the process. If an attempt to cancel the overall process is made, all of the affected objects in the chain need to be informed of the attempt to cancel. In addition, all of the affected objects need to be in a state that enables cancellation for the entire process to be cancelled. As such, cancellation of all of the affected objects needs to be considered in handling the attempt to cancel the overall process.

In some implementations, a building block for a cancellation model is integrated in status schemas of objects. In these implementations, the building block for the cancellation model ensures that an entire chain of objects is modeled in a consistent way and that situations where different parts of the chain do not fit together are avoided by design. A consistent modeling of the cancellation process along the complete process chain may offer a greater transparency and clarity of the cancellation process as compared to program code. Consistent modeling using the building block for the cancellation model may be beneficial for integrating components of different products and for allowing extensions to also handle cancellation processes of a core process correctly.

There are various ways of implementing objects in software applications. The term "object node" is used in this description to refer to either an overall object or particular elements of an object (e.g., particular methods and/or attributes associated with the object). When an object node is used in a business software application, the object node may be referred to as a business object node or an application object node. The term "data object node" also may be used to refer to an object node. A data object node may refer to a business object node, for example, that includes variables and methods related to a business entity, such as a document (e.g., a sales order, a purchase order or an invoice), an organization (e.g., such as a business partner, supplier or customer) or a person (e.g., such as an employee or a customer). A data object node also may refer to a processing object node, such as an object node that processes information for an entity being processed in a workflow.

Figure 1:
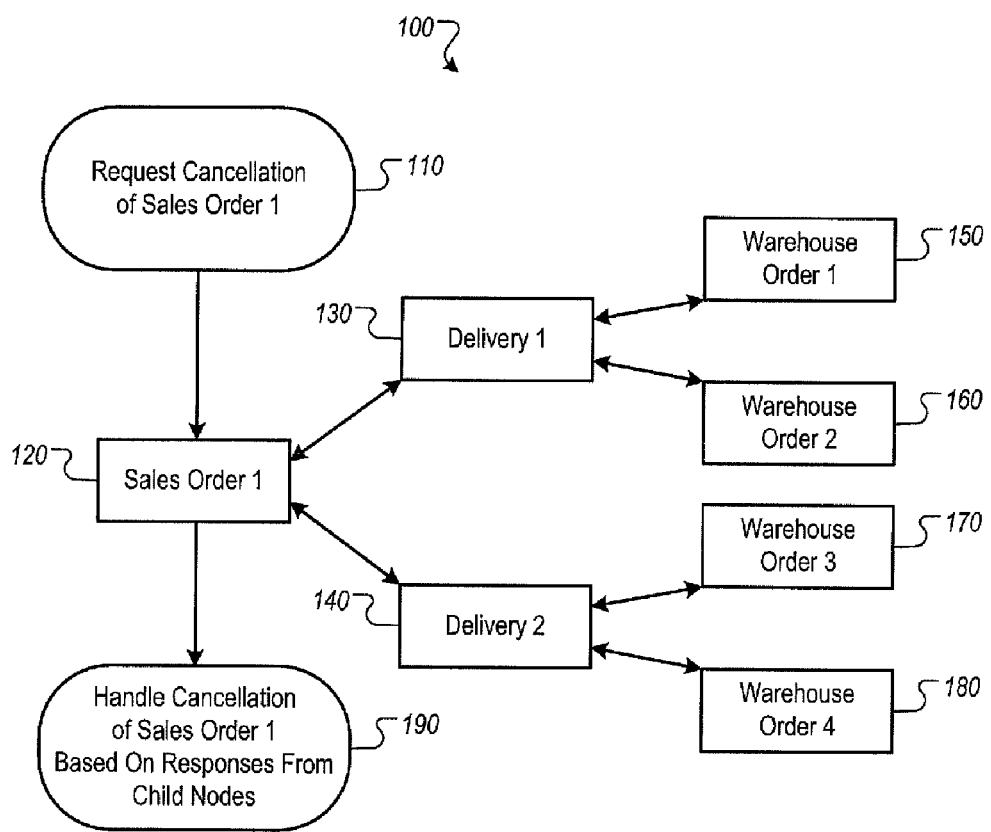
FIG. 1 is a diagram that depicts an example of handling cancellation of a data object node instance.

FIG. 1 illustrates an example 100 of handling cancellation of a data object node instance. As shown, FIG. 1 includes a chain of data object node instances that results from creation of a sales order data object node instance 120. The sales order data object node instance 120 results in two delivery data object node instances 130, 140. The two delivery data object node instances 130, 140 have a logical relationship with the sales order data object node instance 120 and may be described as child nodes of the sales order data object node instance 120 because they are generated in response to creation of the sales order data object node instance 120. The delivery data object node instance 130 results in two warehouse data object node instances 150, 160 and the delivery data object node instance 140 also results in two warehouse data object node instances 170, 180. The warehouse data object node instances 150, 160 have a logical relationship with the delivery data object node instance 130 and may be described as child nodes of the delivery data object node instance 130 and grandchild nodes of the sales order data object node instance 120. Similarly, the warehouse data object node instances 170, 180 have a logical relationship with the delivery data object node instance 140 and may be described as child nodes of the delivery data object node instance 140 and grandchild nodes of the sales order data object node instance 120.

If the sales order data object node instance 120 is to be cancelled, the sales order data object node instance 120 needs to ensure that the two delivery data object node instances 130, 140 also are cancelled. In order for the two delivery data object node instances 130, 140 to be cancelled, all four warehouse data object node instances 150, 160, 170, 180 have to be cancelled. Because, in some examples, physical constraints do not permit the cancellation of warehouse orders from a certain point in the process (e.g., once they already have been executed), the cancellation of the warehouse orders may fail which in turn has to be propagated upwards in the chain to prevent the sales order from being cancelled in its entirety.

For instance, when a request to cancel the sales order data object node instance 120 is received 110, the sales order data object node instance 120 sends a message related to ability to cancel to the two delivery data object node instances 130, 140. The message related to ability to cancel may be a request to cancel the delivery data object node instances 130, 140 that invokes a cancellation process at the delivery data object node instances 130, 140. The message related to ability to cancel also may be a message querying the delivery data object node instances 130, 140 to determine whether the delivery data object node instances 130, 140 are in a state that enables cancellation.

In response to receiving the message related to ability to cancel, the delivery data object node instances 130, 140 begin a process to determine whether the delivery data object node instances 130, 140 are able to be cancelled. Because cancellation of a delivery data object node instance is dependent on all related warehouse data object node instances being cancelled, the delivery data object node instances 130, 140 each identify related warehouse data object node instances and send a message related to ability to cancel to the related warehouse data object node instances. For instance, the delivery data object node instance 130 sends a message related to ability to cancel to the two warehouse data object node instances 150, 160 and the delivery data object node instance 140 sends a message related to ability to cancel to the two warehouse data object node instances 170, 180.

In response to receiving the message related to ability to cancel, each of the warehouse data object node instances 150, 160, 170, 180 determine whether they are in a state that enables cancellation. For instance, each of the warehouse data object node instances 150, 160, 170, 180 determines whether they have been executed. Based on results of the determination, the warehouse data object node instances 150, 160, 170, 180 each send a message to its corresponding parent delivery object node instance to indicate whether or not cancellation is allowed.

For example, the delivery data object node instance 130 receives a message from the warehouse data object node instance 150 indicating whether the warehouse data object node instance 150 is able to be cancelled. In addition, the delivery data object node instance 130 receives a message from the warehouse data object node instance 160 indicating whether the warehouse data object node instance 160 is able to be cancelled. The delivery data object node instance 130 aggregates the responses from the warehouse data object node instances 150, 160 and makes a determination of whether it can be cancelled based on the aggregated responses. In this example, the delivery data object node instance 130 determines that it is able to be cancelled when the aggregated responses reveal that both of the warehouse data object node instances 150, 160 are able to be cancelled. Alternatively, the delivery data object node instance 130 determines that it is unable to be cancelled when the aggregated responses reveal that one or both of the warehouse data object node instances 150, 160 are unable to be cancelled. Based on results of the determination, the delivery data object node instance 130 sends a message to the sales order data object node instance 120 indicating whether or not the delivery data object node instance 130 is able to be cancelled. The delivery data object node instance 140 performs a similar determination process as the delivery data object node instance 130 and sends a message to the sales order data object node instance 120 based on results of the similar determination process.

The sales order data object node instance 120 receives a message from the warehouse delivery data object node instance 130 indicating whether the delivery data object node instance 130 is able to be cancelled. In addition, the sales order data object node instance 120 receives a message from the delivery data object node instance 140 indicating whether the delivery data object node instance 140 is able to be cancelled. The sales order data object node instance 120 aggregates the responses from the delivery data object node instances 130, 140 and makes a determination of whether it can be cancelled based on the aggregated responses. In this example, the sales order data object node instance 120 determines that it is able to be cancelled when the aggregated responses reveal that both of the delivery data object node instances 130, 140 are able to be cancelled. Alternatively, the sales order data object node instance 120 determines that it is unable to be cancelled when the aggregated responses reveal that one or both of the delivery data object node instances 130, 140 are unable to be cancelled.

Based on the responses received from the child nodes (e.g., the delivery data object node instances 130, 140) and the determinations made based on the responses, the sales order data object node instance 120 handles the request to cancel 190. For instance, when the responses reveal that all of the data object node instances in the chain are able to be cancelled, the sales order data object node instance 120 invokes a cancellation action for the sales order data object node instance 120. The sales order data object node instance 120 also may request cancellation of all of its child data object node instances to cancel the entire process related to the sales order data object node instance 120.

In some examples, the cancellation actions and messages exchanged between the data object node instances are defined by a cancellation building block integrated in a status schema model. The cancellation building block may define how a data object node instance handles a cancellation request. Each data object node type may have a different variant of the cancellation building block that is tailored to handling cancellation requests for instances of the data object node type. The different variants of the cancellation building block may be linked to define a cancellation model or pattern that accounts for a chain of objects participating in a process. Because the cancellation building blocks are integrated in the status schema model and linked to define a cancellation model or pattern, cancellation of a data object node instance that leads to a chain of data objects may be handled reliably, consistently, and with relative ease.

Figure 2:
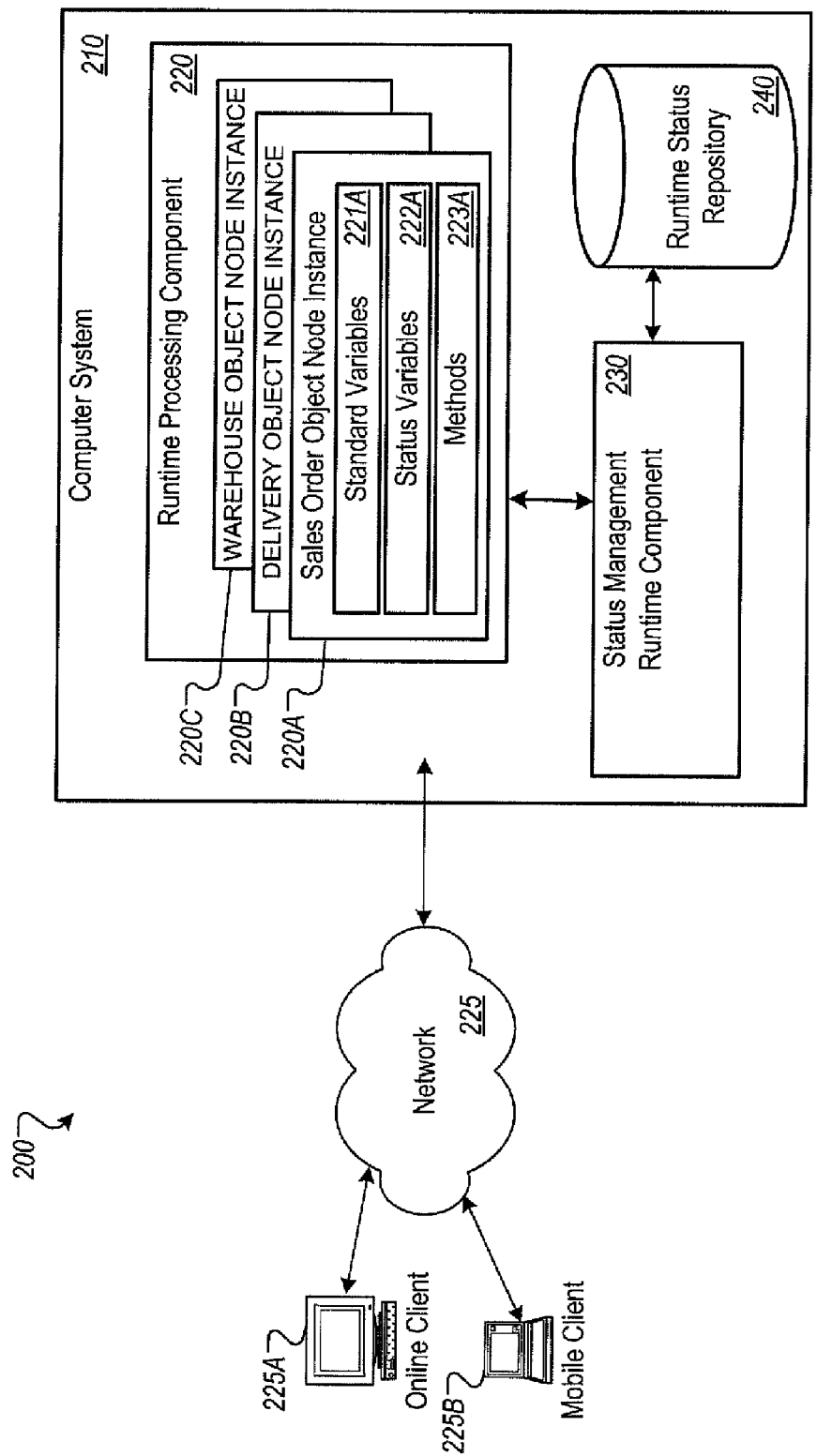
FIGS. 2 and 4 are block diagrams of computer systems that use a constraint-based model to control data processing.

FIG. 2 shows a system 200 of networked computers that uses a constraint-based model to control data processing. In general, the system 200 uses a status schema instance of a status schema model to determine whether an action is permitted to be performed by a data object node.

More particularly, the system 200 of networked computers includes a computer system 210 having a runtime processing component 220, a runtime status management component 230 and a runtime status repository 240. The computer system 210 may be a general-purpose computer or a special-purpose computer.

The runtime processing component 220 includes various data object nodes (here, sales order object node instance 220A, a delivery object node instance 220B and a warehouse object node instance 220C). Each of the object node instances 220A, 220B and 220C is a collection of data variables and methods that may be performed by the data object node instance. In this example, each instance 220A-220C has standard variables, each of which corresponds to a characteristic or attribute of the object node instance. For example, a sales order object node instance 220A may include, for example, standard variables identifying a customer to whom the sale was made and the date of the sale. Each instance 220A-220C also has one or more status variables. A status variable indicates a status of the data object node instance. For example, a status variable may indicate the status of a data object node instance relative to a stage of processing. In a more particular example, a status variable may indicate whether a sales order object node instance 220 has been cancelled. Each instance 220A-220C also has methods that may be executed by the object node instance. As shown, the sales order object node instance 220A has standard variables 221A, status variables 222A and methods 223A. The object node instances 220B and 220C also have standard variables, status variables and methods (not shown).

As shown here, the object node instances 220A, 220B and 220C each correspond to a principal entity represented in the computer system 210. Each of the example object node instances 220A-220C relate to a document used in a business process—here, respectively, the instances correspond to documents used in the business process of delivering merchandise sold to a customer. Another example of a data object node instance includes information about a customer, an employee, a product, and a business partner (such as a supplier). A data object node instance may be stored as one or more rows in a relational database table (or tables), a persistent object instance in an object-oriented database, data in one or more extensible mark-up language (XML) files, or one or more records in a data file.

In some implementations, an object node instance may be related to other object node instances. In one example, a sales order may include multiple sales order nodes, such as a root node identifying information that applies to the sales order (such as information that identifies the customer and the date the sales order was placed) and one or more item nodes identifying information related to each type of item ordered (such as an item number, quantity ordered, price of each item and cost of items ordered). In another example, each of the sales order object node instance 220A, delivery object node instance 220B and warehouse object node instance 220C may relate to a sale of merchandise to a customer. As such, each of object node instances 220A-220C may be said to relate to one another.

Figure 3:
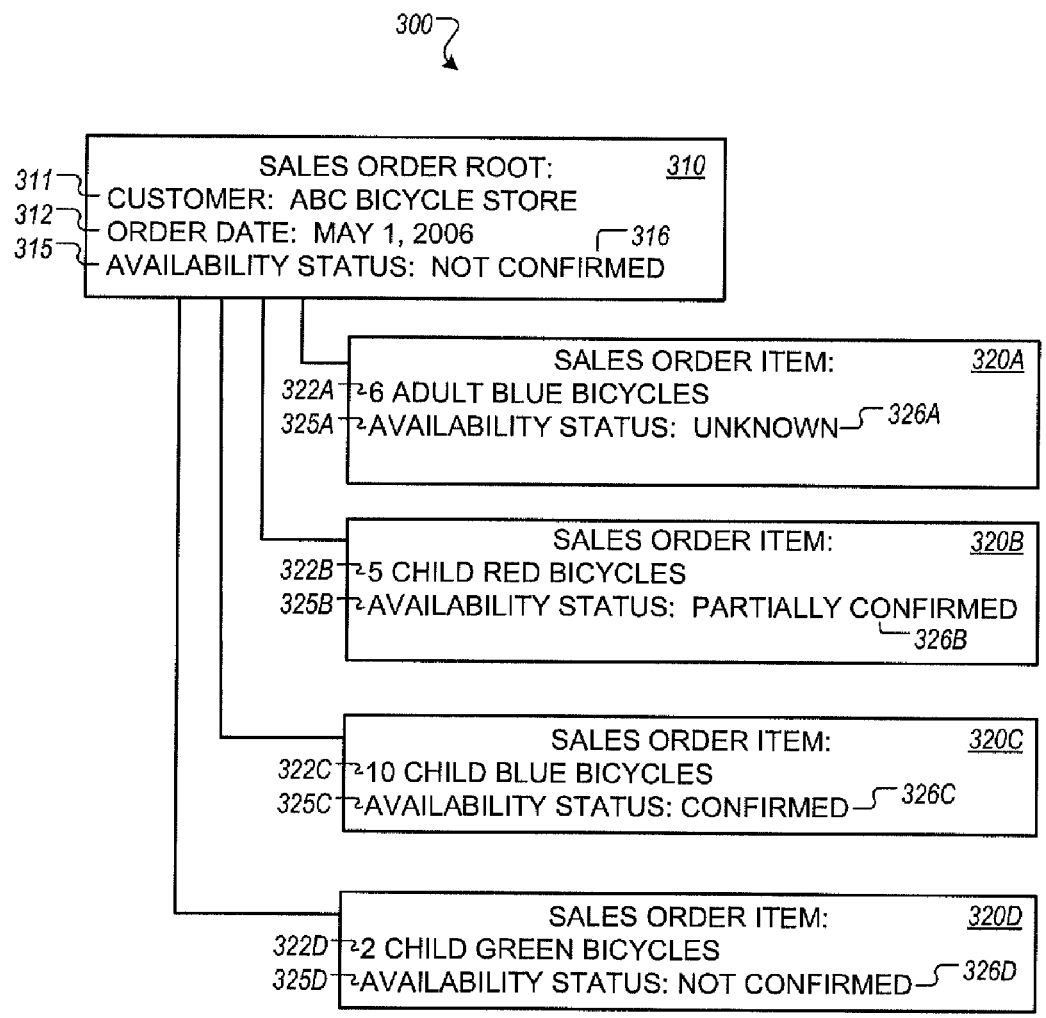
FIG. 3 is a block diagram of runtime sales order node instances.

FIG. 3 illustrates an example of runtime sales order node instances 300, which collectively represent a sales order by a customer (i.e., "ABC Bicycle Store") for products (i.e., bicycles). In this example, a sales order root instance 310 is related to sales order item instances 320A-320D. The sales order root instance 310 may be referred to as the parent node of each of the sales order item instances 320A-320D. In turn, each of the sales order item instances 320A-320D may be said to be a child node of the sales order root instance 310. Each of the sales order item instances 320A-320D also may be referred to as a sibling node of the other sales order item instances 320A-320D.

More particularly, the sales order root instance 310 has a customer 311 variable with a value "ABC Bicycle Store" and an order date 312 variable with a value of "May 1, 2006." Each variable 311 and 312 may be referred to as a standard variable or characteristic of the sales order root. The sales order root 310 has an availability status variable 315 having a value 316 of NOT CONFIRMED. As described more fully later, the availability status value of 316 is a reflection of the available status values of the sales order item instances 320A-320D.

Each of the sales order item instances 320A-320D have a standard variable 322A-322D with a value describing a type of bicycle and a corresponding quantity purchased. For example, sales order item instance 320A has a standard variable 322A identifying "6 adult blue bicycles" as the type and quantity of a bicycle purchased.

Each of the sales order item instances 320A-320D also has an availability status variable 325A-325D having a value 326A-326D that identifies the availability status of the bicycles identified in the standard variable 325A-325D. For example, the sales order item 320A has an availability status value 326A of UNKNOWN for six adult blue bicycles; the sales order item 320B has an availability status value 326B of PARTIALLY CONFIRMED for five child red bicycles; the sales order item 320C has an availability status value 326C of CONFIRMED for ten child blue bicycles; and the sales order item 320D has an availability status value of NOT CONFIRMED for two child green bicycles.

In some implementations, the sales order item instances 320A-320D may relate to additional child or successor data object node instances. For example, each of sales order item instances 320A-320D may relate to a single delivery data object node instance. In the example shown in FIG. 1, the sales order item instances 320A-320D may relate to the two delivery data object node instances 130, 140, with the confirmed portions of the sales order item instances 320A-320D being related to the delivery data object node instance 130 and the unconfirmed or unknown portions of the sales order item instances 320A-320D being related to the delivery data object node instance 140. In this example, the delivery data object node instance 130 may be a child node of the sales order item instance 320C and a child node for the confirmed portion of the sales order item instance 320B. The delivery data object node instance 140 may be a child node of the sales order item instance 320A, a child node of the sales order item instance 320D, and a child node for the unconfirmed portion of the sales order item instance 320B. Although not illustrated, additional data object node instances (e.g., warehouse data object node instances) may be included.

Referring again to FIG. 2, the status management runtime 230 tracks status information associated with object node instances 220A-220C in the status repository 240 and makes determinations, on behalf of the object node instances, as to whether actions are allowed to be performed based at least in part on the status information associated with the object nodes in the status repository.

When one of the object node instances 220A, 220B or 220C of the runtime processing component 220 receives a request to perform an action, the object node instance 220A, 220B or 220C sends a request to the status management runtime component 230 to determine whether the action is allowed to be performed. The status management runtime component 230 checks the runtime status repository 240 to determine whether the status information associated with the object node instance 220A, 220B or 220C permits the action to be performed. The status information associated with the object node instance may include the values of one or more status variables associated with the object node instance and one or more constraints identifying what actions may be allowed to be performed based at least in part on the values of the one or more status variables. The status information also may include one or more constraints identifying what status variable values may be allowed to be set following the performance of an action. The status information may include one or more constraints identifying what status variable values may be changed based on a change in one or more other status variable values.

When the outcome of the determination specifies that the action is not allowed, the status management runtime component 230 sends a response to the object node instance 220A, 220B or 220C indicating that the action is not allowed to be performed, and the object node instance 220A, 220B or 220C processes the negative response by inhibiting the action from being performed. One example of inhibiting the action is to send an error message to the source that requested the action to be performed. Another example is to simply ignore the action request and continue on as if the action had never been requested. Yet another example is forwarding the negative response to another application for processing.

On the other hand, when the outcome of the determination specifies that the action is allowed, the status management runtime component 230 sends a response to the object node instance 220A, 220B or 220C indicating that the action is allowed to be performed, and the object node instance 220A, 220B or 220C processes the positive response. One example of processing a positive response is performing the action. Another example of processing the possible response is by forwarding the response to another application for processing.

In some implementations, a list of requested actions may be sent to an object node instance 220A, 220B or 220C for determinations of the requested actions and subsequently returns the positive and/or negative responses to the client application for further processing.

Status variable value information associated with an object node instance may be previously stored in the status repository 240 or passed by the object node instance along with the check action request.

The status information also may be based on a status schema instance derived from a design-time model. The status schema instance may include relevant status variables and associated status values, actions and conditions modeled for corresponding object nodes and stored in the status repository 240. For example, at design-time, the status schema for an object node, may define constraints for actions by describing which actions are allowed for which status values, and define which status values may be or are set after the completion of the action. At runtime, a status schema instance may be loaded from the status repository 240 by the status management runtime 230 with the current values of the status variables for object node instances.

The runtime processing component 220 illustrates a service-based approach in which services are provided by object node instances 220A-220C to other computing entities over the network 225. Examples of the network 225 include the Internet, wide area networks (WANs), local area networks (LANs), or any other wired or wireless network. As illustrated in this example, services are offered to an online client system 225A and a mobile client system 225B, which each may be a general-purpose computer that is capable of operating as a client of the runtime processing component (such as a desktop personal computer, a workstation, or a laptop computer running an application program), or a more special-purpose computer (such as a device specifically programmed to operate as a client of a particular application program). For brevity, FIG. 2 illustrates only a single online client system 225A and a single mobile client system 225B. However, actual implementations may include many such computer systems.

The architecture of system 200 illustrates a service-oriented architecture, which defines objects and relationships of objects to provide services usable by other computing systems or components. The service-oriented architecture (or portions thereof) may be developed and licensed (or sold) by a commercial software developer. The service-oriented architecture 200 is one example of a computing environment in which the described principles, concepts and techniques may be implemented. The techniques apply to other architectures and system designs, as would be understood by a person skilled in the art. The service-oriented architecture is being described to illustrate an example to help articulate the described techniques.

In another example, the described techniques may be implemented in a software application or software components that are developed and licensed (or sold) by a commercial software developer. Examples of commercial software applications include customer relationship management or sales applications, supply chain management applications, financial management applications, or human resources management applications. The applications may work in conjunction with one or more other types of computer applications to form an integrated enterprise information technology (IT) solution for a business enterprise. In some architectures, for example, a service-oriented architecture, the described techniques may be implemented in data objects and as software service components.

The architecture shown in FIG. 2 may allow for a less burdensome and more coherent state management of an object node instance by providing a status management runtime component 230. The runtime processing component 220 in some implementations may correspond to an application runtime component. Although the status management runtime component 230 is depicted as a separate runtime component from the runtime processing component 220, the status management runtime component 230 need not necessarily be a separate component. In one example, the status management runtime component 230 may be part of the runtime processing component 220. In another example, some or all of the functions described with respect to the status management runtime component 230 may be performed by the runtime processing component 220.

As a result of the architecture shown in FIG. 2, object node programmers need only to code calls to the status management runtime component 230 to make sure an action is allowed to be performed, instead of having to understand, identify and account for all constraints that are based on the status of an object node instance. Additionally, by having object node status information represented in the status repository 240, the status management runtime component 230 is able to use this information in a coherent manner as to not make any determination independent of an object node instance's state.

As described previously, a data object node at design-time may have multiple status variables, each status variable has a predetermined, mutually exclusive set of possible status values. At runtime, each status variable of a data object node instance has one of the possible status values, which may be referred to as the current value of the status variable. The current value of all status variables of a data object node instance may be referred to as the "current status" of the data object node instance. Alternatively, in some implementations, the current value of all status variables of a data object node instance may be referred to as the "state" of the data object node instance. In this description, the term "state" of the data object node instance generally is used to refer to the current value of all variables (both status variables and standard variables), whereas the term "current status" of the data object node instance generally is used to refer to the current value of all status variables (and not including the current value of standard variables).

Figure 4:
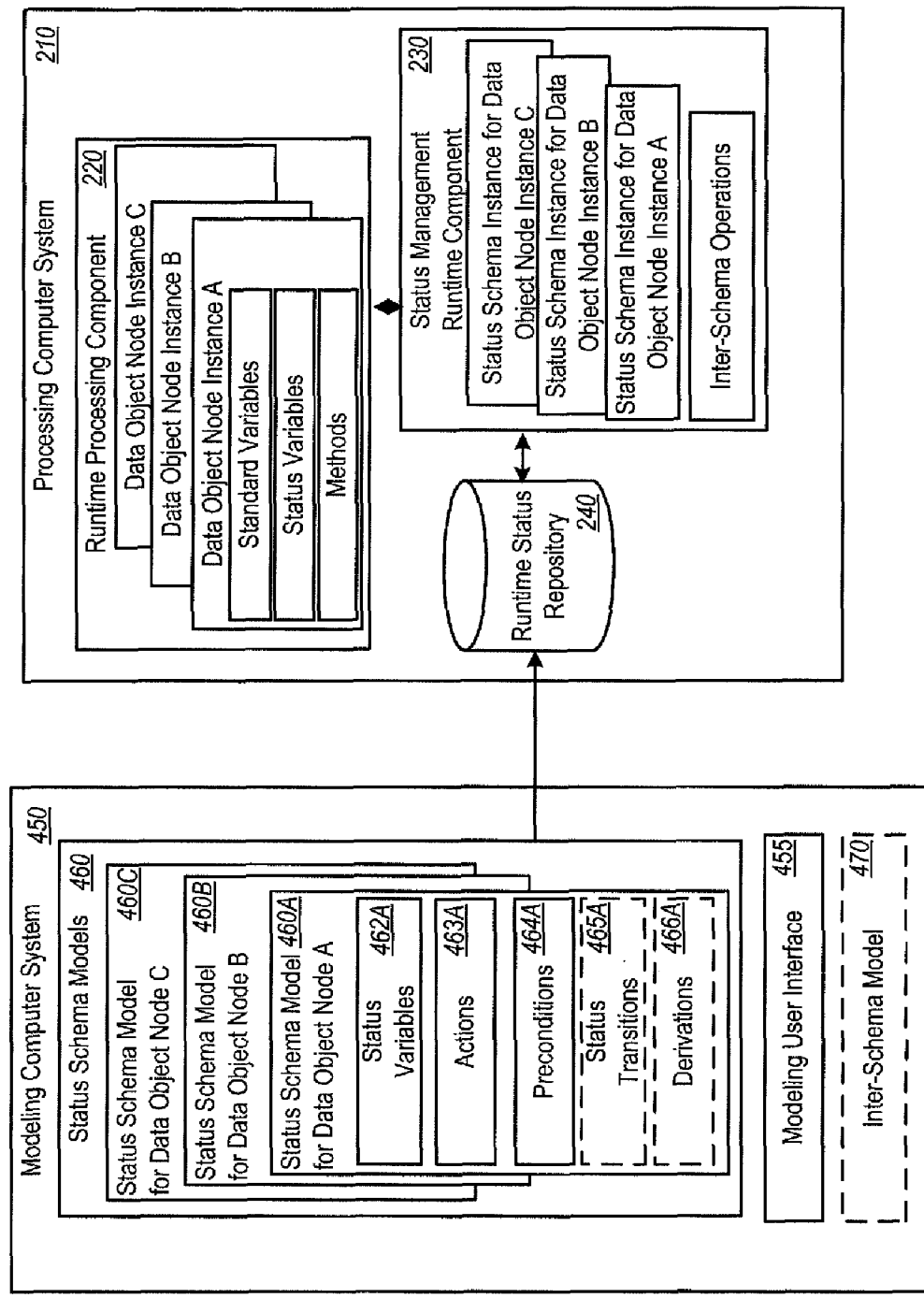

FIG. 4 shows another example of a system 400 of networked computers that uses a constraint-based model to control processing of data object node instances. The system 400, like the system 200 of FIG. 2, includes a computer system 210 having a runtime processing component 220, a status management runtime component 230, and a status repository 240. In this example, the computer system 210 may be referred to as a processing computer system 210.

The system 400 also includes a modeling computer system 450 capable of generating and presenting on a display device (or devices) a modeling user interface 455 for defining status schema models 460 for data object nodes. A data object node corresponds to one or more data object node instances, each of which is capable of being processed by the processing computer system 210. In general, once the status schema models 460 have been defined and, perhaps, simulated on the modeling computer system, the status schema models 460 are transformed into a format usable by the status management runtime component 230 and stored in the runtime status repository 240. As described previously, the status management runtime component 230 uses information in the runtime status repository 240 to determine whether the status information associated with a data object node instance permits a particular action to be performed by the data object node instance. As such, the status schema models are created in the modeling environment (here, represented by the modeling computer system) and used without modification by the runtime environment (here, represented by the processing computer system).

More particularly, the modeling user interface 455 enables a user at design-time to define a status schema model for a data object node. A data object node also is associated with a data model defining standard variables, status variables and methods for the data object node, and, therefore, for data object node instances generated for the data object node.

In general, a status schema model identifies constraints for performing an action of a data object node. More particularly, the status schema models 460 include a status schema model 460A for data object node A, a status schema model 460B for data object node B, and a status schema model 460C for data object node C. As illustrated by the status schema model 460A, each status schema model 460A, 460B or 460C, includes status variables 462A (and for each status variable, a set of predefined permissible values) and actions 463A. As shown, each status schema model includes preconditions (such as preconditions 464A for status schema model 460A). A precondition identifies how a status affects whether an action is to be performed at runtime by a data object node instance having the status. For example, a precondition may identify a condition that must be fulfilled for an action to be performed by a data object node instance corresponding to the data object node to which the status schema model corresponds. An action (such as one of actions 463A) represents a process step that can be performed on an instance of a data object node for which the status schema model corresponds. A precondition (such as one of preconditions 464A) is a type of constraint that generally relates an action with a status value of one of the status variables 462A. A precondition may enable or inhibit an action. At runtime, the preconditions of an action are evaluated to determine whether the action is permitted to be performed on or by the data object node instance to which the status schema model relates.

Another type of constraint which may be used in some status schema models is a status transition. A status transition represents a status value of a status variable that is permitted to be set when a particular action is performed on a data object node instance corresponding to the status schema model of the data object node. The architecture 400 optionally includes status transitions 465A for status schema model 460A for object node A.

Each of status schema models 460B and 460C also include status variables, actions, and preconditions for actions (not shown). Each of status schema models 460B and 460C may include status transitions and derivations, described below (not shown).

The modeling user interface 455 also may support inter-schema modeling. For example, a status schema model for a data object node may include inter-schema modeling elements (such as derivations 466A associated with status schema model 460A). In another example, inter-schema modeling elements may be stored in a separate inter-schema model 470. Inter-schema modeling, for example, may model how a status variable in a status schema model of one data object node may influence a status variable in a status schema model of another data object node.

Two examples of such inter-schema processes are population and aggregation derivations. In general, a population derivation "pushes" or copies a status value of a status variable from a parent data object node to corresponding status variables in one or more child data object nodes of the parent data object node. An aggregation derivation determines an appropriate status value of a status variable for a parent data object node based on status values of the corresponding status variable in one or more child data object nodes. The architecture 400 optionally includes derivations 466A, which may include population derivations and aggregation derivations, for status schema model 460A for object node A.

The derivations 466A in the status schema model 460A for object node A also may include one or more lifecycle (or overall) status derivations for object node A. For example, when there are several status variables in the status schema model for object node A, the model may include a status variable that reflects an overall processing status of object node A. Such an overall status variable generally is not used to determine whether a particular action is permitted to be performed on an instance of the object node, although some implementations may use the status value of the lifecycle status variable to do so.

In many cases, the modeling computer system 450 is used by software developers or programmers who are designing and implementing status schema models which correspond to data object nodes. The status schema models and data object nodes may be used, for example, to enable a service-oriented architecture for processing data that is applicable to many business enterprises. In such a case, data object nodes along with the runtime status repository that corresponds to status schema models for the data object nodes may be sold (or licensed) to many business enterprises. Thus, the processing computer system 210 may be operated and used by a different business enterprise than the business enterprise that operates and uses the modeling computer system 450.

In some implementations, the modeling computer system 450 may be used to extend, enhance or otherwise add to the status schema models corresponding to the data object nodes used in the processing computer system 210. In such a context, the modeling computer system 450 may be used by a business enterprise other than the commercial software developer who designed and implemented data object nodes or the runtime status repository. The modeling computer system 450, for example, may be operated by a software integrator or consulting organization that is implementing or enhancing the runtime processing component for a particular, or group of, business enterprises. In a more particular example, an initial runtime status repository may be generated from a first modeling computer system based on status schema models provided by the commercial software development organization that designed, implemented and sold the data object nodes used by the runtime processing component. A consulting organization may use a second modeling computer system to extend the status schema models in permitted ways for use in a particular industry or by a particular business enterprise.

Because status schema models are defined for a data object node, the models enable the definitions of business processing with a fine granularity, which may help enable or improve process flexibility and reuse of the status schema models. Also, because the status schema models reflect business logic used in runtime processes, the status schema models promote visibility and transparency of business processes, which, in turn, may reduce application development errors and programming side-effects. Also, the status schema models may result in computer-supported business processes that more accurately reflect real-world business processes, which, in turn, may help to promote the development and proper use of more accurate and easier-to-understand computer systems.

Figure 5:
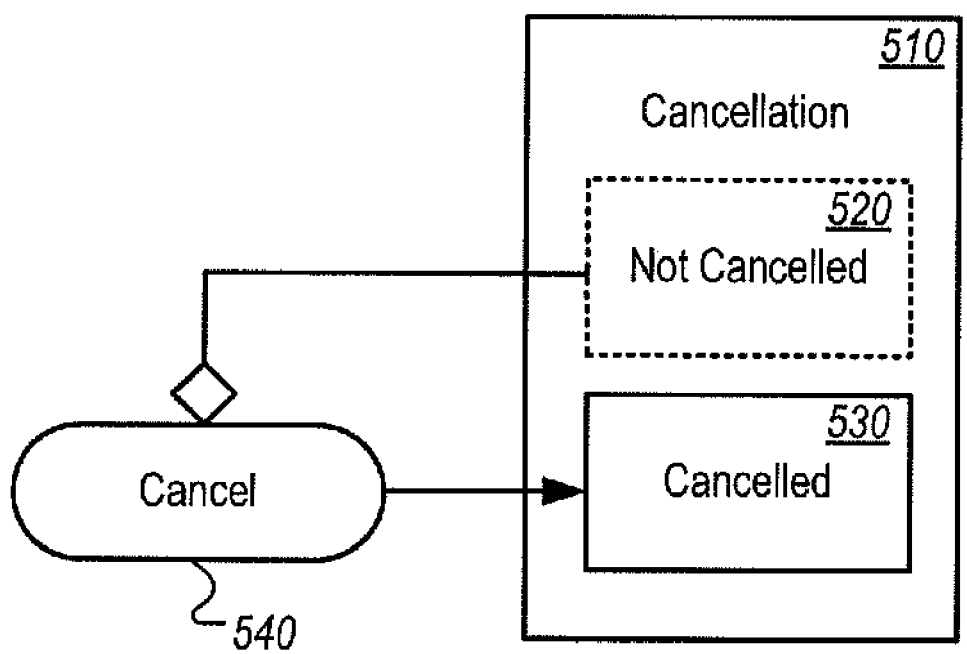
FIGS. 5-9 are block diagrams that depict examples of cancellation status schema.

FIG. 5 depicts an example of cancellation status schema (e.g., a cancellation building block), which may be integrated in a status schema model. The cancellation status schema may be defined and modified, using, for example, the modeling computer system 450 described previously with respect to FIG. 4. The cancellation status schema is a design-time model. Design-time status schema models may be used to show relations between an object's state and actions, which may define constraints for the actions by describing which actions are allowed for which status values, and define which status values are to be set after the completion of an action. At runtime, a cancellation status schema instance may be loaded, for example, from the runtime status repository 240 described previously with respect to FIG. 4, by the status management runtime component 230 with the current values of the status variables.

As illustrated, the cancellation status schema includes a single cancellation status variable 510 (shown as "Cancellation") with two possible cancellation status values 520 and 530 (shown as "Not Cancelled" and "Cancelled," respectively), and a cancellation action 540 (shown as "Cancel"). The cancellation status schema may be instantiated with the initial value Not Cancelled 520, as indicted by the dotted-line border. The action 540 (i.e., "Cancel"), for example, causes the status value Cancelled 530 to be set. The Not Cancelled 520 status value is a precondition of the Cancel action 540—that is, in this example, a "Cancel" action is not allowed unless the Not Cancelled 520 status value is currently set in the cancellation variable 510. This example illustrates an instantaneous cancellation action that is always allowed (e.g., which cannot be declined), unless there already was a cancellation.

As illustrated in this example, the modeled cancellation status variable and its status values represent the cancellation state of the object node. The status values represent the possible values a cancellation status variable is allowed to take up, while the cancellation status variable lists all possible allowed status values. At runtime, the cancellation status variable then specifies information about the currently valid value. The modeled actions represent the cancellation methods that may be performed on or by the object node. Whether they are allowed or not is dependent on the currently set status value associated with the object node's state. The modeled preconditions are identified by the connections (lines or edges) from status values to actions, and they represent the status value constraints allowing or permitting the actions. The modeled transitions are identified by the edges (or lines) that come out of an action and connect to a resulting status value, and they represent constraints allowing or permitting the setting of a status value following the performance of an action (for example, as triggered by an updating process). The model may also identify edges (or lines) drawn from one status value of one variable to another status value of another variable (not shown), indicating that one status change directly triggers another one. The status management runtime component 230 may adjust such other status information in the status repository 240 during application runtime when the data objects are processed.

Figure 6:
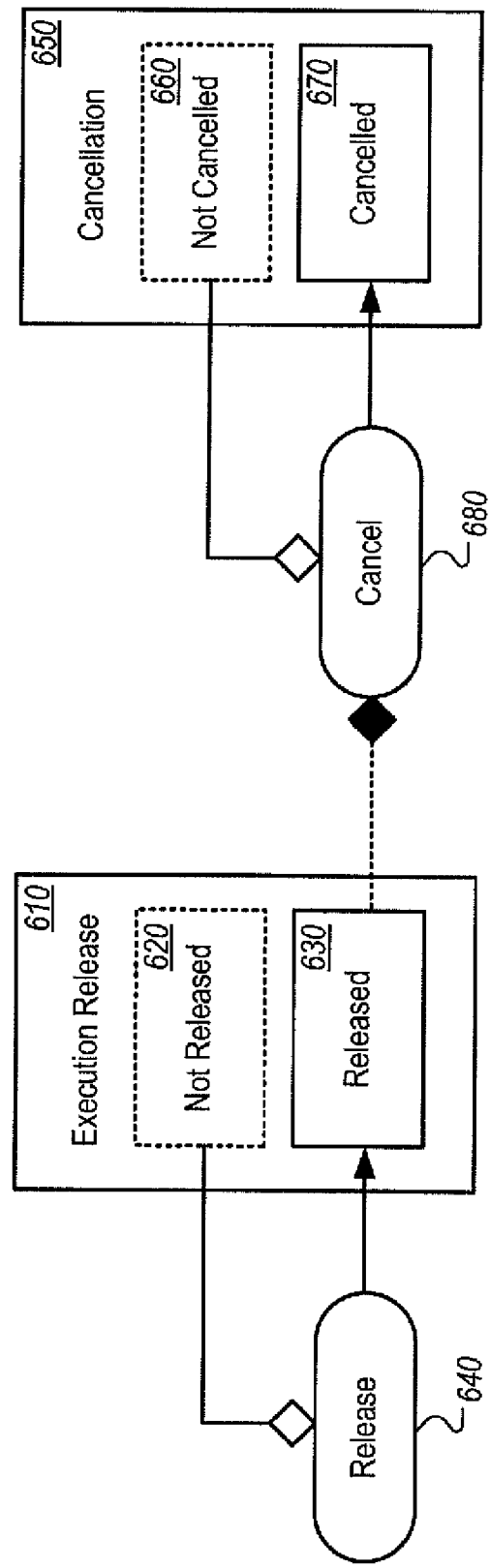

FIG. 6 depicts an example of cancellation status schema (e.g., the cancellation building block shown in FIG. 5), which is integrated in a status schema model with other status variables and actions. As illustrated, the other status variables and actions include a single execution release status variable 610 (shown as "Execution Release") with two possible status values 620 and 630 (shown as "Not Released" and "Released," respectively), and an action 640 (shown as "Release"). The status schema may be instantiated with the initial value Not Released 620, as indicted by the dotted-line border. The action 640 (i.e., "Release"), for example, causes the status value Released 630 to be set. The Not Released 620 status value is a precondition of the Release action 640—that is, in this example, a "Release" action is not allowed unless the Not Released 620 status value is currently set in the execution release variable 610.

The cancellation status schema includes a single cancellation status variable 650 (shown as "Cancellation") with two possible cancellation status values 660 and 670 (shown as "Not Cancelled" and "Cancelled," respectively), and a cancellation action 680 (shown as "Cancel"). The cancellation status schema may be instantiated with the initial value Not Cancelled 660, as indicted by the dotted-line border. The action 680 (i.e., "Cancel"), for example, causes the status value Cancelled 670 to be set. The Not Cancelled 660 status value is a precondition of the Cancel action 680—that is, in this example, a "Cancel" action is not allowed unless the Not Cancelled 660 status value is currently set in the cancellation variable 650.

The example shown in FIG. 6 illustrates instantaneous cancellation that can be declined. Specifically, the other status variable (i.e., the execution release status variable 610) serves as a precondition of the Cancel action 680. In this example, a release (e.g., when the execution release status variable 610 has a status value of Released 630) inhibits any further cancellation. For instance, when the execution release status variable 610 has a status value of Released 630, a request to cancel the data object node is declined because all of the preconditions to cancellation are not met. When the execution release status variable 610 has a status value of Not Released 620, a request to cancel the data object node is allowed because all of the preconditions to cancellation are met.

Figure 7:
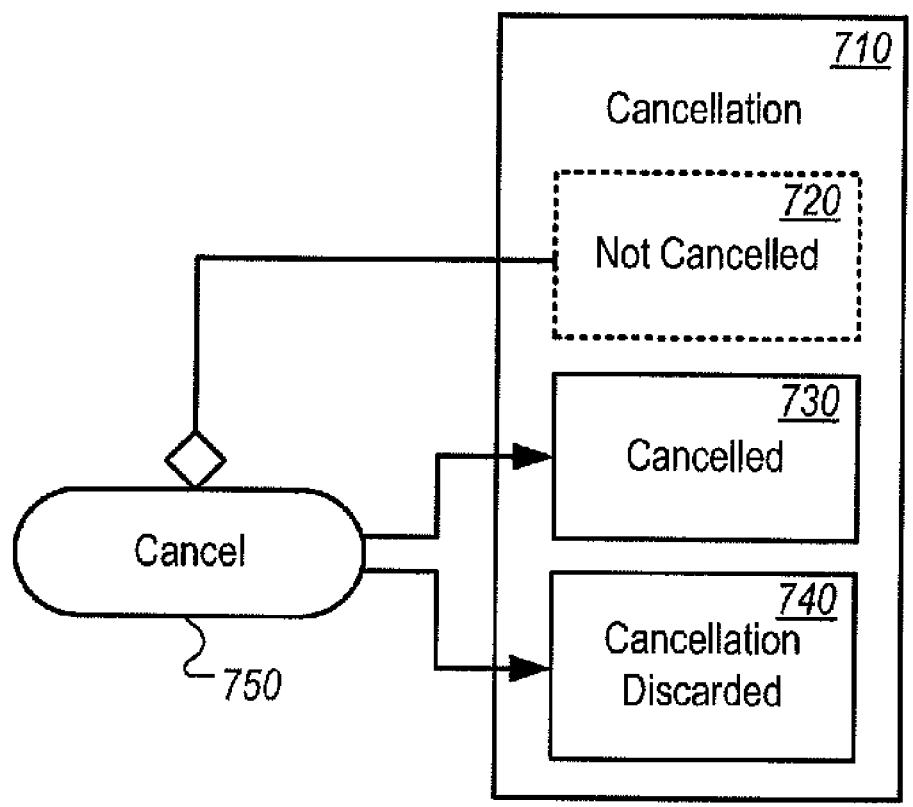

FIG. 7 depicts another example of cancellation status schema (e.g., a variant of the cancellation building block shown in FIGS. 5 and 6), which may be integrated in a status schema model. As illustrated, the cancellation status schema includes a single cancellation status variable 710 (shown as "Cancellation") with three possible cancellation status values 720, 730, and 740 (shown as "Not Cancelled," "Cancelled," and "Cancellation Discarded," respectively), and a cancellation action 750 (shown as "Request Cancellation"). The cancellation status schema may be instantiated with the initial value Not Cancelled 720, as indicted by the dotted-line border. The action 750 (i.e., "Request Cancellation") causes the status value Cancelled 730 to be set when cancellation is allowed and occurs. The action 750 (i.e., "Request Cancellation") causes the status value Cancellation Discarded 740 to be set when cancellation is declined. The Not Cancelled 720 status value is a precondition of the Request Cancellation action 750—that is, in this example, a "Request Cancellation" action is not allowed unless the Not Cancelled 720 status value is currently set in the cancellation variable 710.

The example shown in FIG. 7 illustrates instantaneous cancellation that can be declined. In addition, the example enables documentation of a fact that an unsuccessful cancellation was attempted for the object node. For example, the action 750 (i.e., "Request Cancellation") determines whether or not a request for cancellation is allowed or successful. When the action 750 determines that cancellation is allowed or successful, the action 750 causes the status value Cancelled 730 to be set to indicate that the data object node is cancelled. When the action 750 determines that cancellation is not allowed or was unsuccessful, the action 750 causes the status value Cancellation Discarded 740 to be set to indicate that cancellation of the data object node was attempted, but was declined (e.g., discarded).

Figure 8:
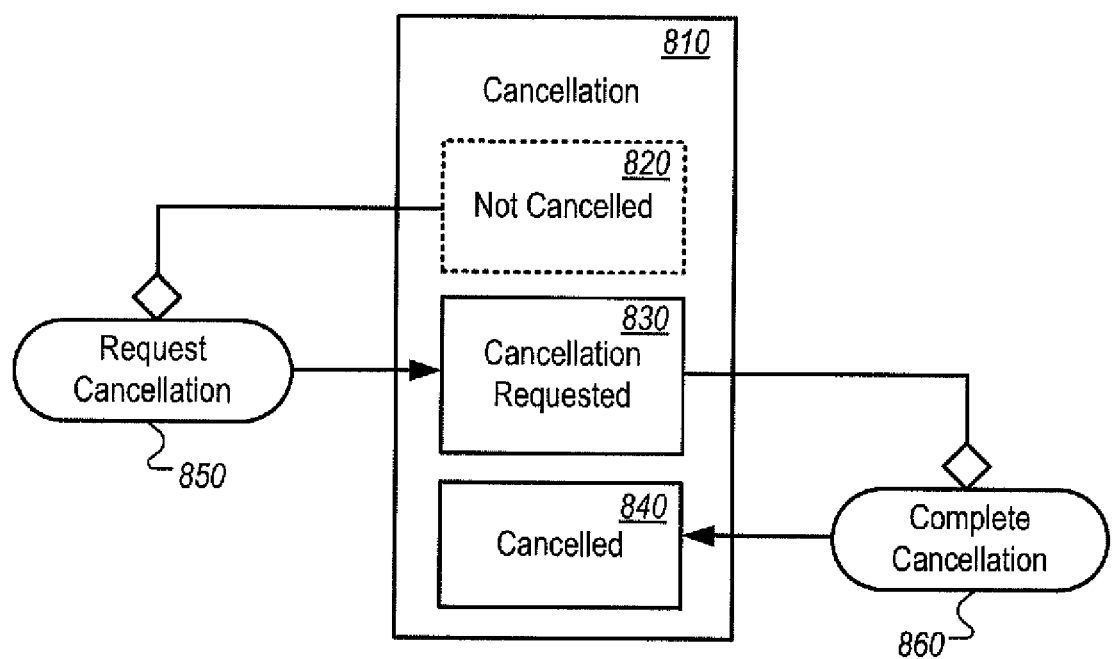

FIG. 8 depicts a further example of cancellation status schema (e.g., another variant of the cancellation building block shown in FIGS. 5 and 6), which may be integrated in a status schema model. As illustrated, the cancellation status schema includes a single cancellation status variable 810 (shown as "Cancellation") with three possible cancellation status values 820, 830, and 840 (shown as "Not Cancelled," "Cancellation Requested," and "Cancelled," respectively), a first cancellation action 850 (shown as "Request Cancellation"), and a second cancellation action 860 (shown as "Complete Cancellation"). The cancellation status schema may be instantiated with the initial value Not Cancelled 820, as indicted by the dotted-line border. The action 850 (i.e., "Request Cancellation") causes the status value Cancellation Requested 830 to be set when a request for cancellation has been initiated. The action 860 (i.e., "Complete Cancellation") causes the status value Cancelled 840 to be set to when a request for cancellation has been completed. The Not Cancelled 820 status value is a precondition of the Request Cancellation action 850—that is, in this example, a "Request Cancellation" action is not allowed unless the Not Cancelled 820 status value is currently set in the cancellation variable 810.

The example shown in FIG. 8 illustrates a two-step cancellation that cannot be declined. In this example, a cancellation is sure to succeed, but cannot be completed in one step. As such, additional steps are part of the cancellation process itself, rather than mere follow-on steps of the cancellation. Thus, the cancellation is only completed after all steps have been completed. The action 860 (i.e., "Complete Cancellation") monitors for completion of all steps and sets the status value Cancelled 840 when it detects that all steps have been completed. The action 850 (i.e., "Request Cancellation") triggers performance of the additional steps and sets the status value Cancellation Requested 830. The status value Cancellation Requested 830 indicates that steps of the cancellation process have been triggered, even though cancellation may not yet be complete. The status value Cancellation Requested 830 may be used to prevent the steps of the cancellation process from being triggered multiple times unnecessarily.

Figure 9:
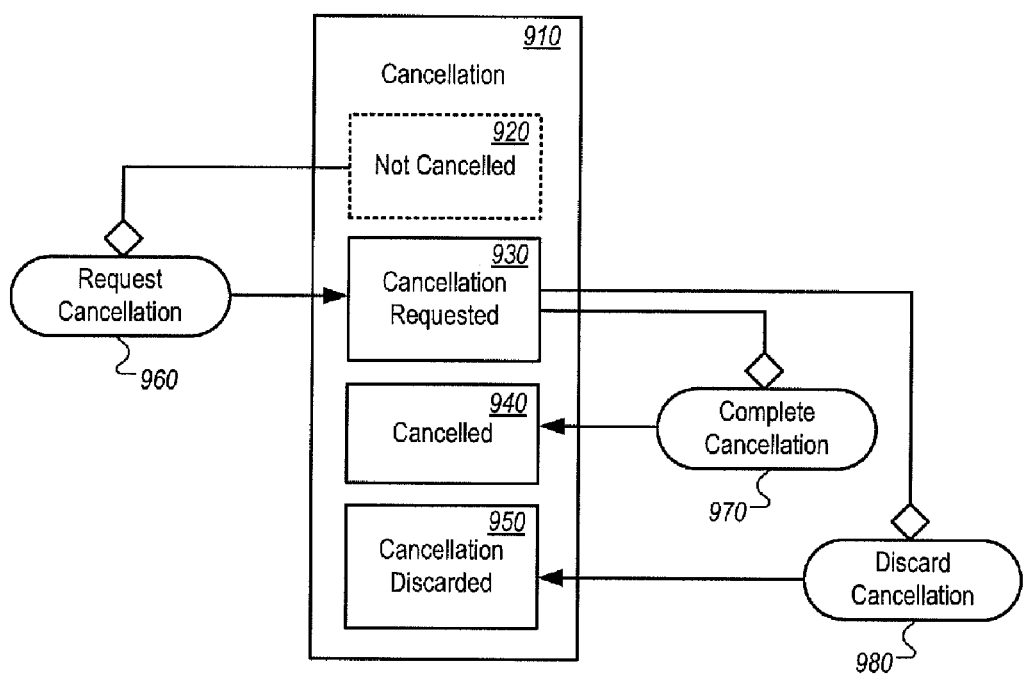

FIG. 9 depicts yet another example of cancellation status schema (e.g., a further variant of the cancellation building block shown in FIGS. 5 and 6), which may be integrated in a status schema model. As illustrated, the cancellation status schema includes a single cancellation status variable 910 (shown as "Cancellation") with four possible cancellation status values 920, 930, 940, and 950 (shown as "Not Cancelled," "Cancellation Requested," "Cancelled," and "Cancellation Discarded," respectively), a first cancellation action 960 (shown as "Request Cancellation"), a second cancellation action 970 (shown as "Complete Cancellation"), and a third cancellation action 980 (shown as "Discard Cancellation"). The cancellation status schema may be instantiated with the initial value Not Cancelled 920, as indicted by the dotted-line border. The action 960 (i.e., "Request Cancellation") causes the status value Cancellation Requested 930 to be set when a request for cancellation has been initiated. The action 970 (i.e., "Complete Cancellation") causes the status value Cancelled 940 to be set to when a request for cancellation has been successfully completed and cancellation is allowed. The action 980 (i.e., "Discard Cancellation") causes the status value Cancellation Discarded 950 to be set to when a request for cancellation has been declined or was unsuccessful. The Not Cancelled 920 status value is a precondition of the Request Cancellation action 960—that is, in this example, a "Request Cancellation" action is not allowed unless the Not Cancelled 920 status value is currently set in the cancellation variable 910.

The example shown in FIG. 9 illustrates a two-step cancellation that can be declined. This example needs four different status values to show all possible states of the cancellation process. When embedding this pattern, the actions also may get constraints from the remaining status variables that control when a cancellation can be requested, completed, or discarded.

Figure 10:
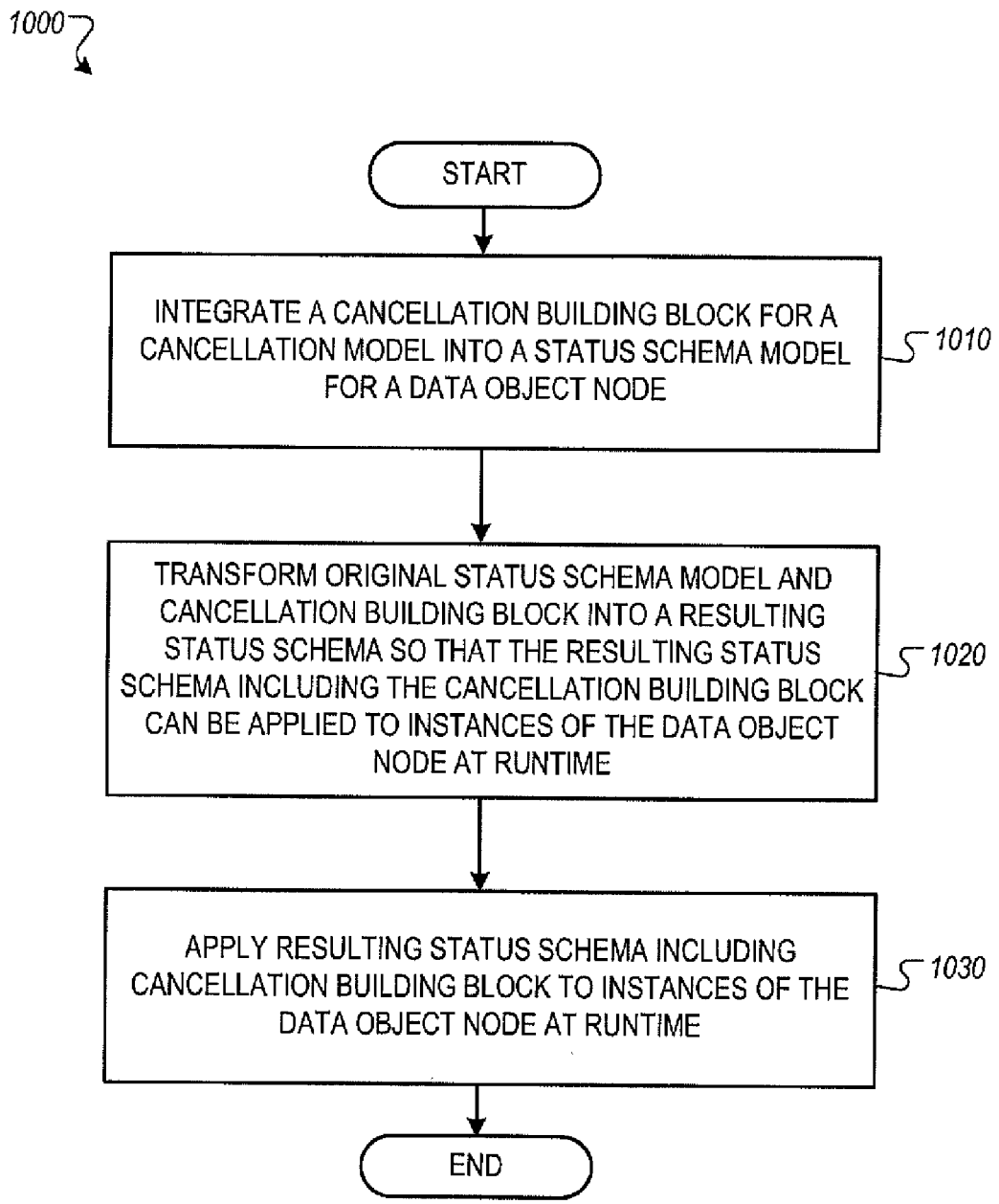
FIG. 10 is a flow chart of an example process for designing and using a status schema model with a cancellation building block.

FIG. 10 shows an example process 1000 for designing and using a status schema model. The process 1000 may be performed, for example, using the modeling computer system 450 and the processing computer system 210, both as described previously with respect to FIG. 4.

The process 1000 includes integrating a cancellation building block for a cancellation model into a status schema model for a data object node (step 1010). This step may be performed, for example, by a user of the modeling computer system 450 executing a computer program presenting a graphical user interface to create and modify a status schema model. For example, a user in one or more sessions may use a graphical user interface to design, simulate and refine a status management model for a data object node, such as schema models shown in FIGS. 5-9, respectively.

Once designed, the original status schema model and the cancellation building block are transformed into a resulting status schema such that the resulting status schema including the cancellation building block can be applied to instances of the data object node at runtime (step 1020). For example, the status schema model may be reformatted for efficient runtime access by an application runtime component or status management runtime component, as described previously with respect to FIGS. 2 and 4. The status schema model may be persistently stored, such as in a runtime status repository 240 of FIG. 2 or 4.

During runtime, the resulting status schema instance including the cancellation building block is applied to instances of the data object node to enforce the status and action constraints (e.g., cancellation constraints) specified by the status schema model (step 1030). One of the advantages of this process is that the status schema model created (and refined) in step 1010 is used to enforce the status and action constraints in step 1030. As such, a visible status-driven process may be defined and consistently applied to data objects. While the model is transformed for use at runtime, the semantic information of the status schema model is not changed in the transformation. The status and action constraints specified by the status schema model for a data object node are applied without deviation at runtime to instances of the data object node.

In some implementations, multiple status schema models may be created for a data object node. In such a case, at runtime, one of the multiple status schema models is applied without deviation to instances of the data object node.

In one example, the graphical user interface of the modeling computer system may include a schema element palette that enables a user to select an element to add to model. The selected element may be a cancellation building block that defines cancellation status and actions related to a data object. FIGS. 11-14 present an implementation of a graphical user interface 1100 having a schema element palette for designing a status schema model and integrating a cancellation building block in the status schema model.

Figure 11:
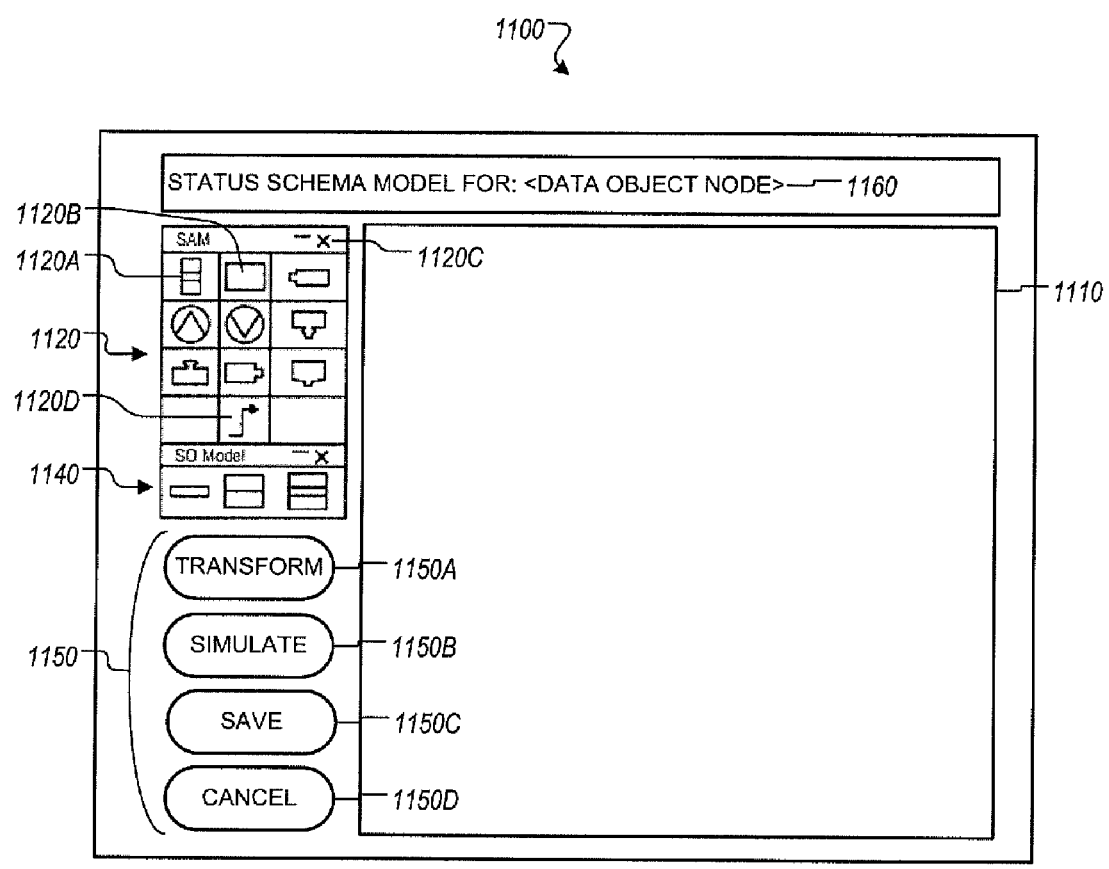
FIGS. 11-14 are example graphical user interfaces.

FIG. 11 illustrates an example graphical user interface 1100 for a modeling computer system that includes a work area 1110 for graphically depicting a status schema model being designed and a schema element palette 1120 having modeling elements. By way of example, a user may interact with the graphical user interface 1100 through the use of a pointing-device, such as a computer-based mouse input device, and/or a keyboard.

More particularly, the work area 1110 is a display area where elements from the schema element palette 1120 are placed and identified, and relationships between elements are established to depict a status schema model for a data object node. The schema element palette 1120 in this example includes, among other elements, a status variable element 1120A, a status value element 1120B, an action element 1120C and an edge element 1120D. In general, a user places an element 1120A-1120D from the palette 1120 in the work area 1110, where the element is represented. The user is able to identify and place elements in the work area 1110 to design and represent a status schema model for a data object node.

In this example, the graphical user interface 1100 also includes a data object node palette 1140 (here, called a business object model) that displays the elements in the model of the data object node for which the status schema model is depicted in the work area 1110 applies. As described previously, the data object node palette 1140 may be used to select status variables, status values and methods included in the data object node model for use in the status schema model depicted in the work area 1110.

The graphical user interface 1100 also includes controls 1150 operable to initiate or perform particular functions. In this example, the controls 1150 are depicted as a graphical user interface buttons that may be activated by a user. The controls 1150 include a transform control 1150A to initiate transformation of the status schema model depicted in the work area 1110 to a runtime representation. The controls 1150 also include a simulate control 1150B to initiate a simulation of the process represented by the status schema model depicted in the work area 1110. The controls 1150 further include a save control 1150C to store the status schema model in persistent storage, and a cancel control 1150D to remove the graphical user interface 1100 from the display device without storing any modeling performed in the modeling session. In some implementations, a consistency check may be performed, for example, before a status schema model depicted in the work area 1110 is saved in persistent storage. The consistency check may verify that modeling rules of the modeling implementation are followed in the status schema model. The consistency check may help to ensure that the elements of the status schema model are consistent with one another and the modeling rules are followed.

The graphical user interface 1100 also includes the name 1160 of the data object node for which the status schema model depicted in the work area 1110 applies.

Figure 12:
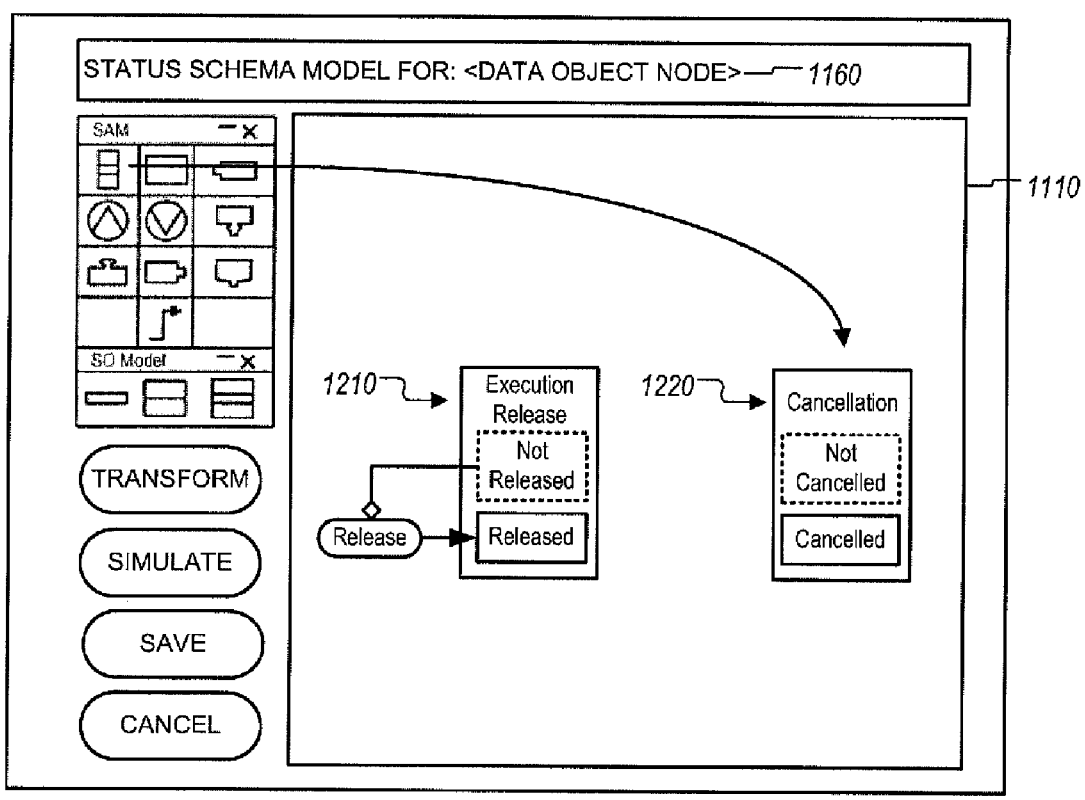

FIG. 12 depicts the graphical user interface 1100 in which a user is integrating a cancellation building block 1220 into prior status schema 1210 for a data object node. The prior status schema 1210 for the data object node is displayed in the graphical user interface 1100 when the data object node is selected for modeling. The cancellation building block 1220 is displayed in the work area 1110 after a user has selected a cancellation status variable element from the schema element palette and dragged-and-dropped the cancellation status variable element onto the work area 1110. Dragging the cancellation building block 1220 into the work area 1110 that displays the prior status schema 1210 integrates the cancellation building block 1220 into the status schema for the data object node.

Figure 13:
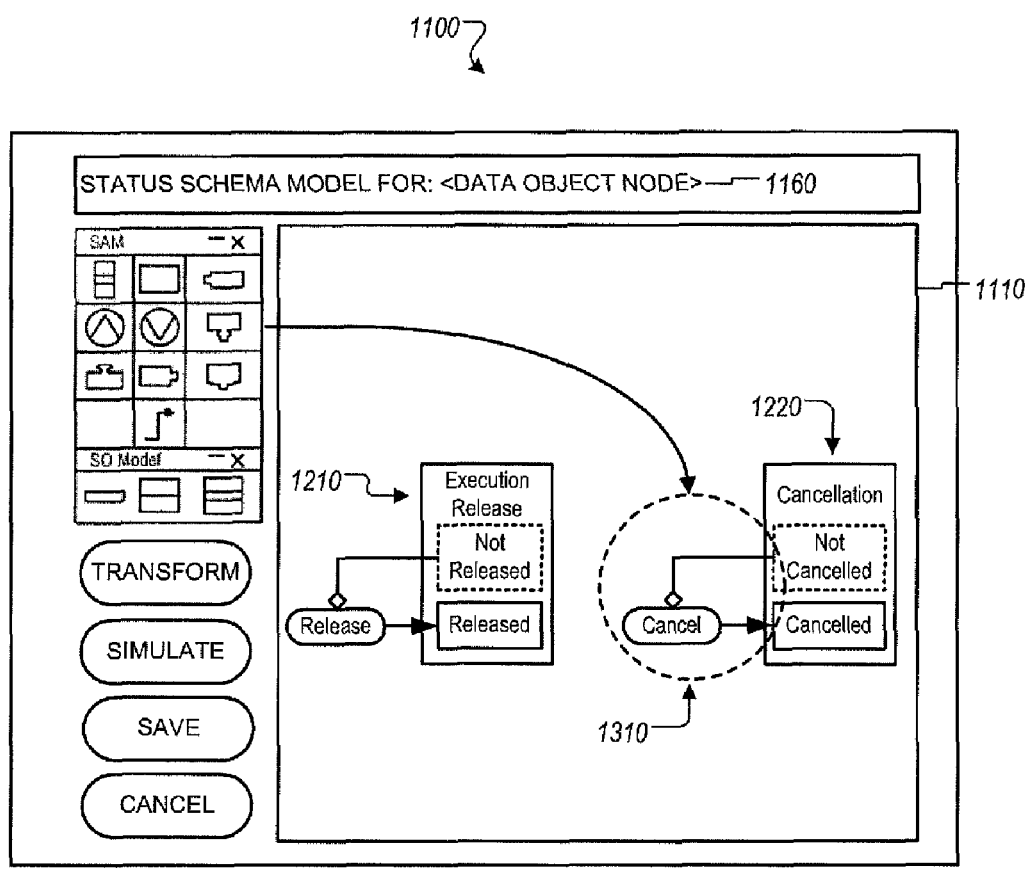

FIG. 13 illustrates the addition of a cancellation action and a precondition 1310 to the status schema model depicted in the work area 1110. To do so, a user selects a cancellation action element from the schema element palette. The graphical user interface 1100 is operable to allow a user to enter (or change) a name for the action and place the action relative to the other elements (here, the cancellation status variable) displayed in the work area 1110. In adding the precondition, a user selects an edge element from the schema element palette for placement on the work area 1110. The user connects the Not Cancelled status value to the cancellation action to establish the precondition.

Figure 14:
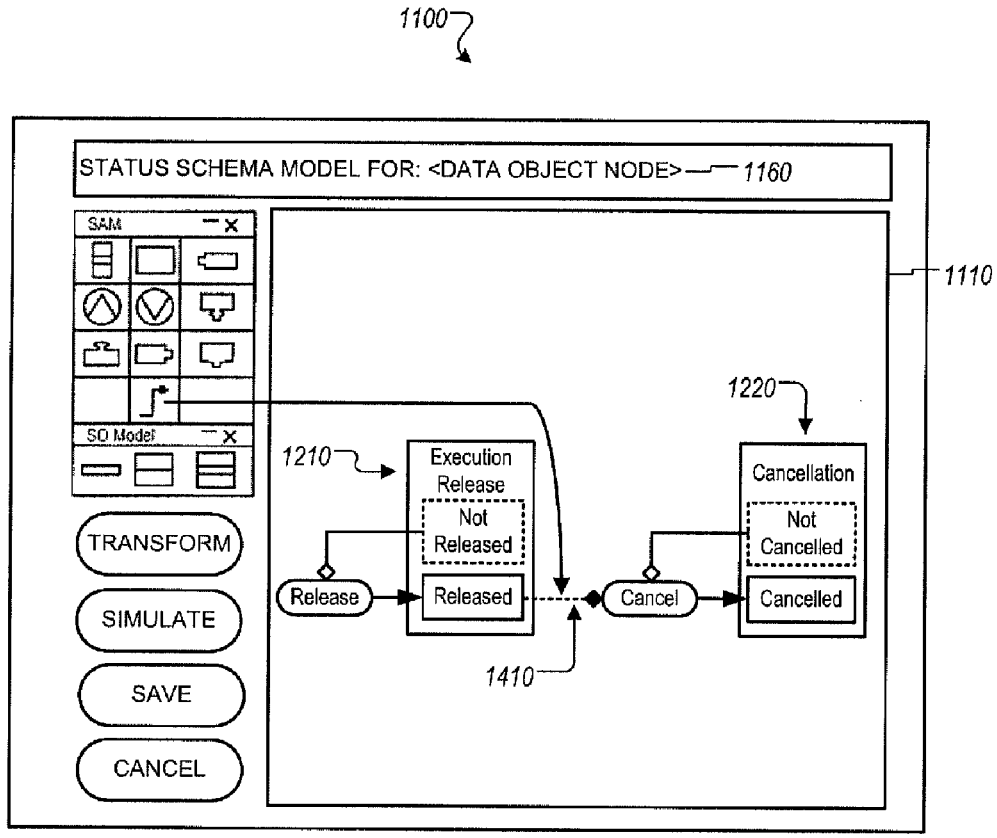

FIG. 14 illustrates the addition of a connection 1410 between the prior status schema 1210 and the cancellation building block 1220 to the status schema model depicted in the work area 1110. In adding the connection 1410, a user selects an edge element from the schema element palette for placement on the work area 1110. The user connects the Released status value from the Execution Release status variable to the cancellation action to establish the Released status value as a precondition to the cancellation action. Specifically, based on the connection 1410, the cancellation action is prevented when the Execution Release status variable is set to the Released status value. By connecting the cancellation building block 1220 with the prior status schema 1210, the cancellation building block 1220 is integrated with the prior status schema 1210 and cancellation of the data object node is impacted by other status variables and/or actions defined within the overall status schema for the data object node.

Although integration of the cancellation building block into the prior status schema has been described as first adding a cancellation status variable to the work area 1110 and then adding a cancellation action and a precondition to the work area 1110, the cancellation building block may include the cancellation status variable, the cancellation action, and the precondition. In this situation, dragging and dropping the cancellation building block onto the work area 1110 may add all of the cancellation status variable, the cancellation action, and the precondition to work area 1110.

In addition, a user may be able to modify a cancellation building block after addition to the work area 1110. For example, the user may add additional status values (e.g., Cancellation Requested, Cancellation Discarded, etc.) to the cancellation status variable and additional cancellation actions (e.g., Request Cancellation, Complete Cancellation, etc.).

Figure 15:
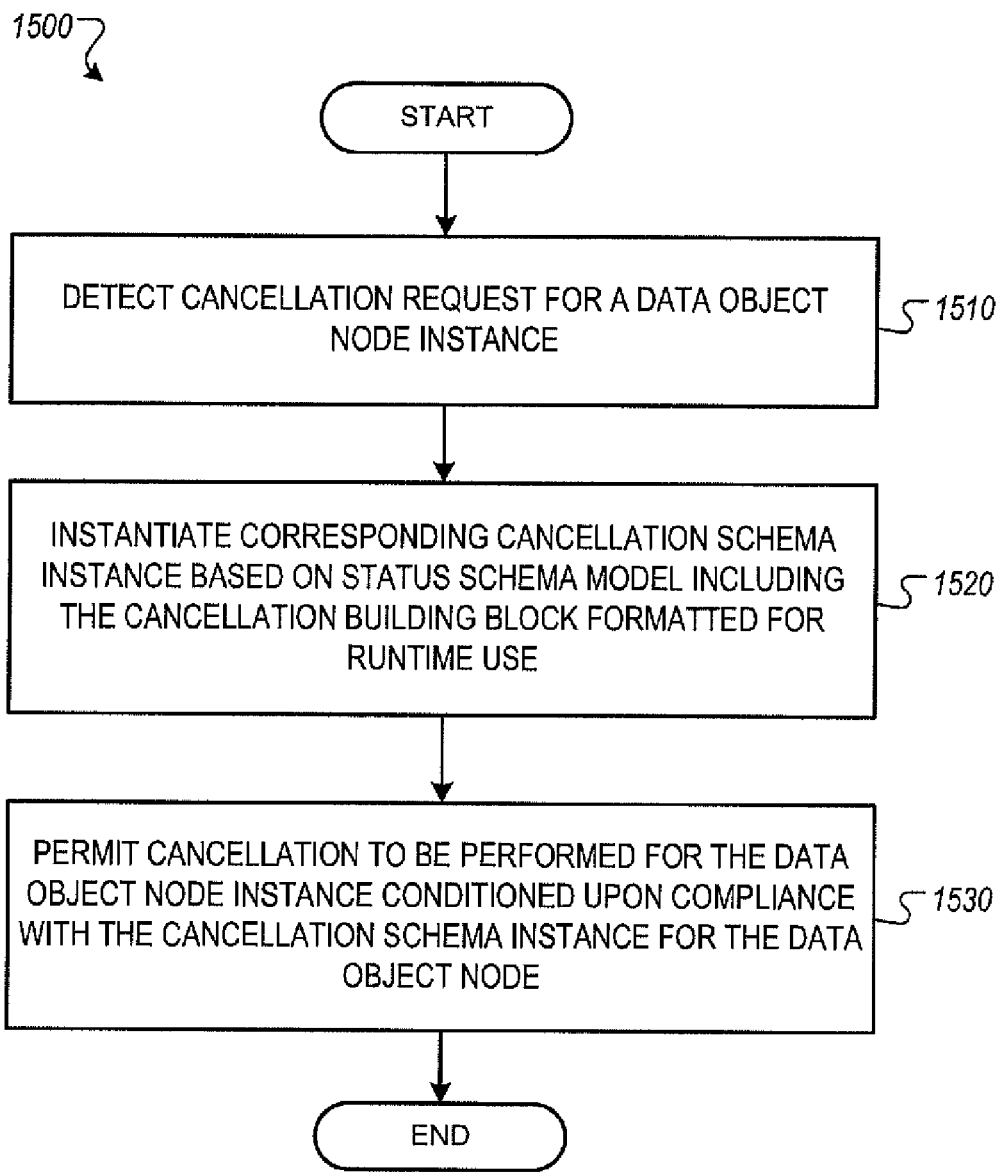
FIG. 15 is a flow chart of an example process for applying a status schema model including a cancellation building block to an instance of a corresponding data object node instance.

FIG. 15 illustrates an example process 1500 for applying a status schema model to an instance of a corresponding data object node instance. The example process 1500 may be an implementation of the application step 1030 described previously with respect to FIG. 10. The process may be implemented in computer-readable medium that is executed by, for example, a processor of the processing computer system 210 described previously with respect to FIG. 4.

The process 1500 begins when the processor implementing the process 1500 detects a cancellation request for a data object node instance (step 1510). The processor instantiates (or creates) a cancellation schema instance corresponding to a cancellation building block included in the status schema model for the data object node of the same type as the data object node instance for which cancellation was requested (step 1520). For example, cancellation schema for a sales order node instance is created by a processing computer system in response to a request to cancel a sales order placed by a customer. A cancellation status schema model for a sales order node is accessed, for example, from the runtime status repository 240 described previously with respect to FIGS. 2 and 4.

The processor permits cancellation to be performed by the data object node instance conditioned upon compliance with the cancellation schema instance for the data object node (step 1530). For example, the processor may determine whether a cancellation action may be performed by the sales order object node instance by evaluating preconditions included in the sales order node status schema instance. In this example, the processor may set a status value of a cancellation variable based on the determination. The processor also may determine whether a cancellation action may be performed by the sales order object node instance by evaluating whether child or successor data object node instances of the sales object node instance (e.g., one or more delivery and/or warehouse data object node instances) can be cancelled. The processor may determine that a cancellation action may be performed by the sales order object node instance when all of the child or successor data object node instances are able to be cancelled.

Figure 16:
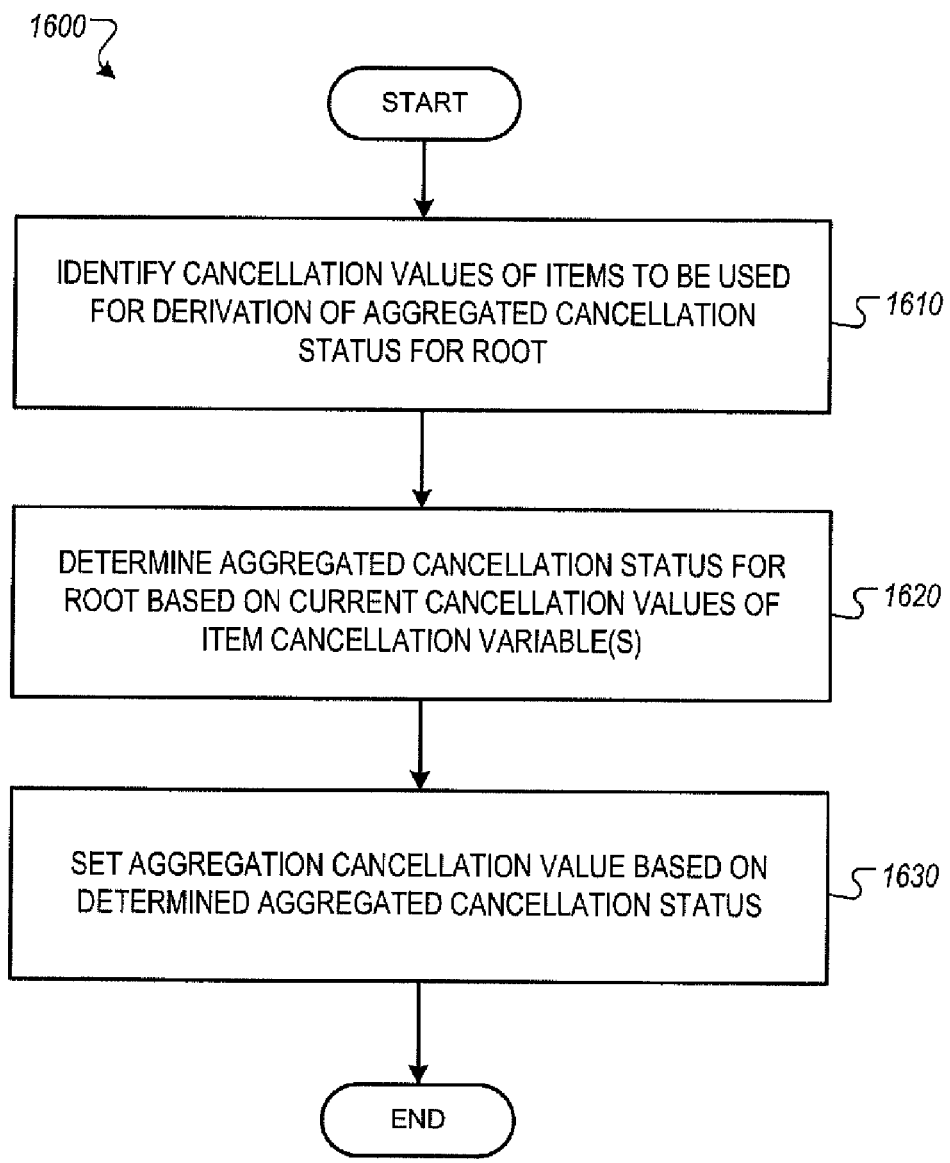
FIG. 16 is a flow chart of an example process of status aggregation.

FIG. 16 illustrates an example process 1600 of the derivation of an aggregated cancellation status for a root schema instance. The process 1600 is performed at runtime. In one example, the process 1600 may be performed at runtime by one or more processors of the computer system 210 of FIG. 2 or the processing computer system 210 of FIG. 4.

The system performing the process 1600 identifies the cancellation values of cancellation variables in item schemas that will be used for the derivation of the aggregated cancellation status for the root schema (step 1610). The system determines aggregated cancellation status for the root schema instance based on the current cancellation status values of the identified cancellation status variables (step 1620). In one example, the determination process is implemented by the data object node instance or an application program. In another example, the determination process is implemented by the status management runtime component. The system sets the cancellation value of the root cancellation variable based on the determined aggregated cancellation status (step 1630) and the process ends.

Figure 17:
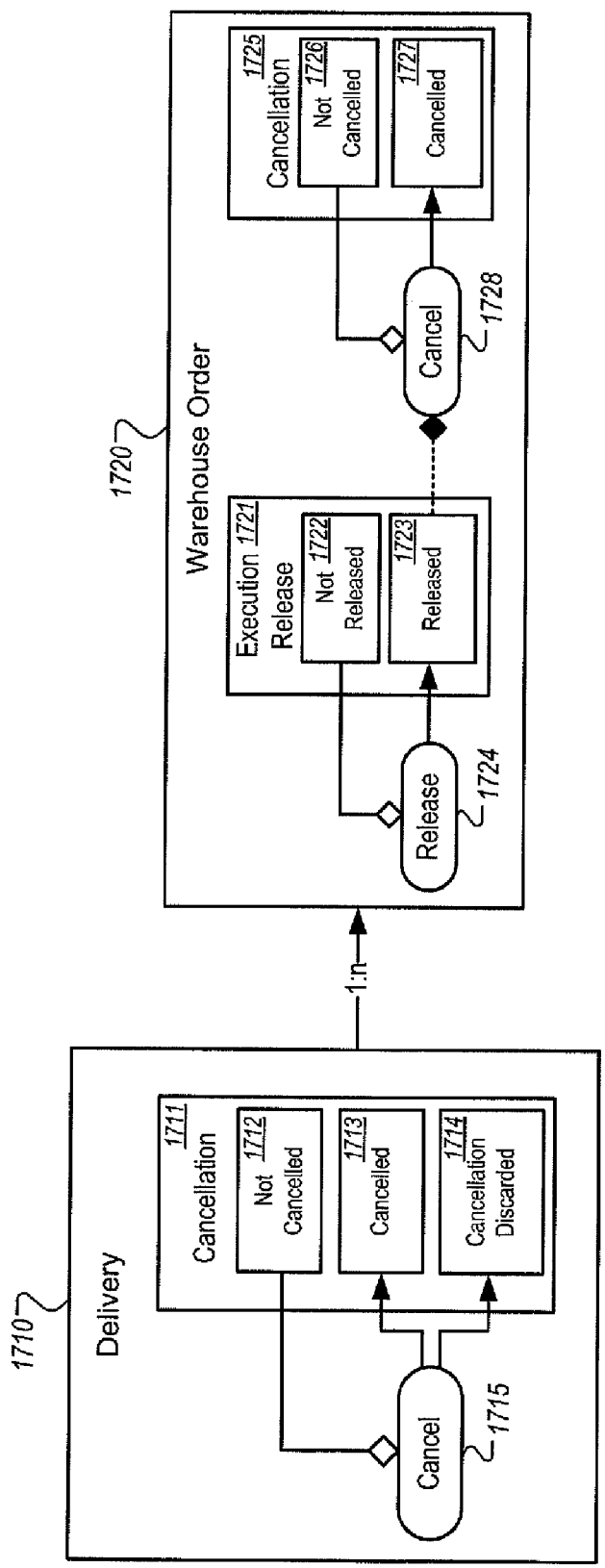
FIGS. 17 and 18 are diagrams of modeling a cancellation in an example process chain.

FIG. 17 illustrates an example of modeling a delivery and warehouse order portion of the cancellation in the example process chain shown in FIG. 1. As shown, the cancellation of a delivery object node 1710 and a warehouse order object node 1720 is displayed.

Similar to the variant of the cancellation building block shown in FIG. 7, the delivery object node 1710 includes a cancellation status variable 1711, which has three possible status values: Not Cancelled 1712, Cancelled 1713, and Cancellation Discarded 1714. The delivery object node 1710 also includes a request cancellation action 1715 that determines whether cancellation is allowed, sets the Cancelled 1713 status value when cancellation is allowed, and sets the Cancellation Discarded 1714 status value when cancellation is not allowed. The Not Cancelled 1712 status value is a precondition to the request cancellation action 1715.

Similar to the cancellation building block integrated with other status variables and actions shown in FIG. 6, the warehouse order object node 1720 includes an execution release status variable 1721, which has two possible status values: Not Released 1722 and Released 1723. The warehouse order object node 1720 also includes a release action 1724 that sets the Released 1723 status value. The Not Released 1722 status value is a precondition to the release action 1724.

The warehouse order object node 1720 further includes a cancellation status variable 1725, which has two possible status values: Not Cancelled 1726 and Cancelled 1727. In addition, the warehouse order object node 1720 includes a cancellation action 1728 sets the Cancelled 1727 status value. The Not Cancelled 1726 status value is a precondition to the cancellation action 1728. Also, the execution release status variable 1721 is a precondition to the cancellation action 1728, where the cancellation action 1728 is allowed when the Not Released 1722 is set and the cancellation action 1728 is prevented when the Released 1723 is set.

In some implementations, the cancellation of the process from the delivery object node 1710 to the warehouse order object node 1720 is only modeled at the warehouse order object node 1720. A warehouse order object node 1720 can be canceled as long as no release to execution of the order has taken place. This is expressed by using an inhibiting precondition from the released to the cancel action. The cancellation itself is an instantaneous step.

For one delivery object node 1710, there can be an arbitrary number of warehouse order object nodes. The request cancellation action 1715 of the delivery object node 1710 determines all related warehouse order object nodes and checks whether they can be cancelled by evaluating the properties of the Cancel action at the related warehouse order object nodes. If all warehouse order object nodes can be cancelled, the delivery object node 1710 cancels them and the request cancellation action 1715 results in the status Canceled 1713. If there are warehouse order object nodes that cannot be cancelled, none of warehouse order object nodes are cancelled and the request cancellation action 1715 leads to the status Cancellation Discarded 1714. In this example, the communication between the delivery object node 1710 and the warehouse order object node 1720 is synchronous so that the delivery cancellation can take place in one step.

Figure 18:
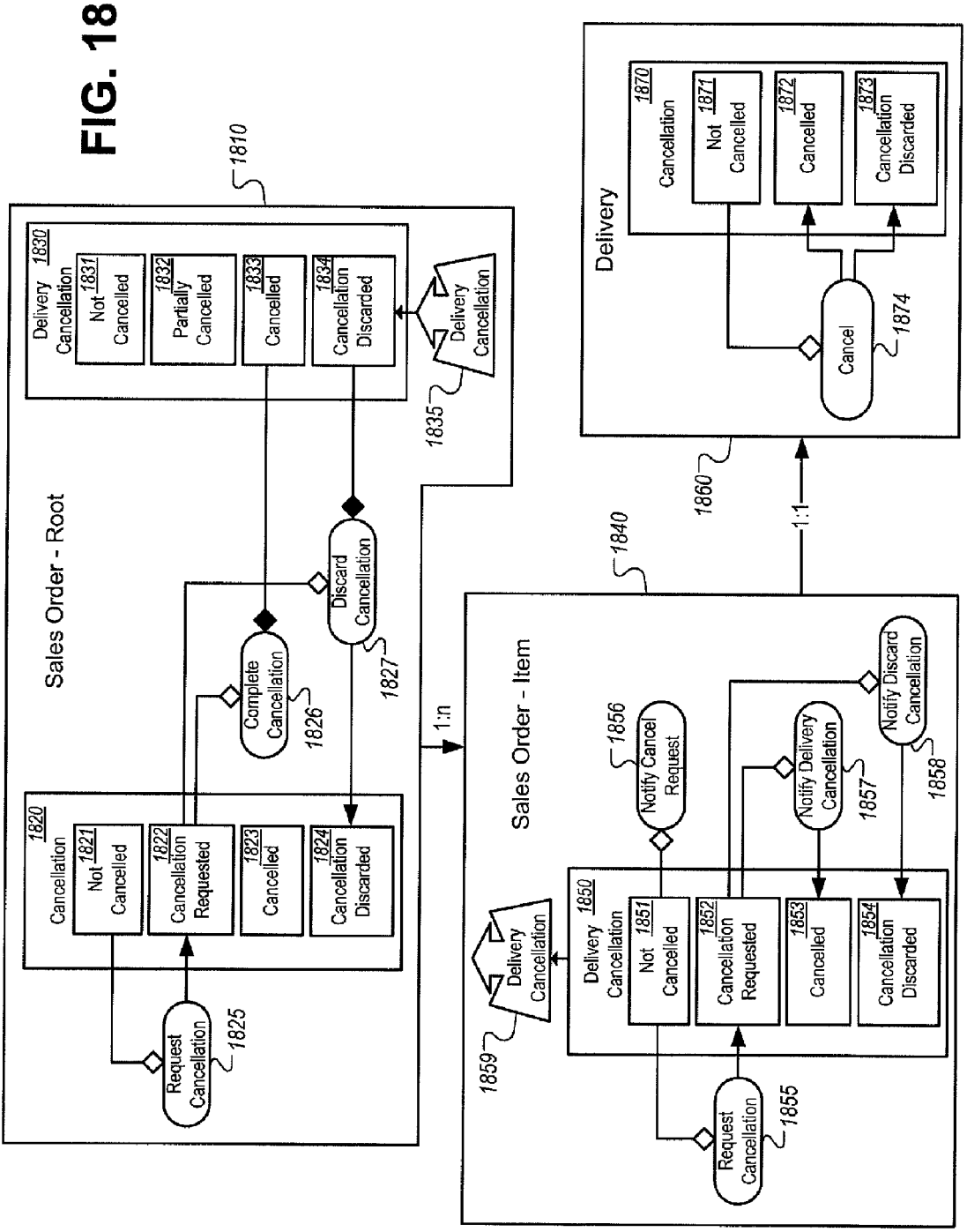

FIG. 18 illustrates an example of modeling a sales order portion of the cancellation in the example process chain shown in FIG. 1. As shown, the cancellation of a sales order root node 1810, a sales order item node 1840, and a delivery object node 1860 is displayed.

The sales order root node 1810 includes a cancellation status variable 1820, which has four possible status values: Not Cancelled 1821, Cancellation Requested 1822, Cancelled 1823, and Cancellation Discarded 1824. The sales order root node 1810 also includes a request cancellation action 1825 that sets the Cancellation Requested 1822 status value and triggers additional steps of a cancellation process for the sales order root node 1810. The Not Cancelled 1821 status value is a precondition to the request cancellation action 1825. The sales order root node 1810 further includes a complete cancellation action 1826 that determines whether cancellation successfully completes and sets the Cancelled 1823 status value when cancellation successfully completes. In addition, the sales order root node 1810 includes a discard cancellation action 1827 that determines whether cancellation was unsuccessful and sets the Cancellation Discarded 1824 status value when cancellation was unsuccessful.

The sales order root node 1810 also models delivery cancellation for the sales order and includes a delivery cancellation status variable 1830, which has four possible status values: Not Cancelled 1831, Partially Cancelled 1832, Cancelled 1833, and Cancellation Discarded 1834. The sales order root node 1810 includes a delivery cancellation aggregation derivation 1835 that aggregates results of the multiple delivery object nodes associated with the sales order root node 1810. For example, the delivery cancellation aggregation derivation 1835 causes the Cancelled 1833 status value to be set when results from all delivery object nodes associated with the sales order root node 1810 have been received and all of the delivery object nodes are able to be cancelled. The delivery cancellation aggregation derivation 1835 causes the Cancellation Discarded 1834 status value to be set when results from one or more delivery object nodes associated with the sales order root node 1810 indicate that the one or more delivery object nodes are not able to be cancelled. The delivery cancellation aggregation derivation 1835 causes the Cancellation Discarded 1834 status value to be set when results indicate that some delivery object nodes can be cancelled, but other delivery object nodes either cannot be cancelled or have unknown cancellation status.

The Cancelled 1833 status value is a precondition to the complete cancellation action 1826 such that setting of the Cancelled 1833 status value triggers the complete cancellation action 1826 to set the Cancelled 1823 status value in the sales order root node 1810. The Cancellation Discarded 1834 status value is a precondition to the c discard cancellation action 1827 such that setting of the Cancellation Discarded 1834 status value triggers the discard cancellation action 1827 to set the Cancellation Discarded 1824 status value in the sales order root node 1810.

The sales order item node 1840 includes a cancellation status variable 1850, which has four possible status values: Not Cancelled 1851, Cancellation Requested 1852, Cancelled 1853, and Cancellation Discarded 1854. The sales order item node 1840 also includes a request cancellation action 1855 that sets the Cancellation Requested 1822 status value and triggers additional steps of a cancellation process for the sales order item node 1810. The Not Cancelled 1851 status value is a precondition to the request cancellation action 1855. The sales order item node 1840 further includes a notify cancellation request action 1856, a notify delivery cancellation action 1857, and a notify discard cancellation action 1858. In addition, the sales order item node 1840 delivery cancellation aggregation derivation 1859 that communicates (e.g., sends a message) to the delivery cancellation aggregation derivation 1835 to indicate whether or not cancellation of the delivery object node corresponding to the sales order item was successful.

The delivery object node 1860 includes a cancellation status variable 1870, which has three possible status values: Not Cancelled 1871, Cancelled 1872, and Cancellation Discarded 1873. The delivery object node 1860 also includes a request cancellation action 1874 that determines whether cancellation is allowed, sets the Cancelled 1872 status value when cancellation is allowed, and sets the Cancellation Discarded 1873 status value when cancellation is not allowed. The Not Cancelled 1871 status value is a precondition to the request cancellation action 1874. The delivery object node 1860 is similar to the delivery object node 1710 and communicates with warehouse order object nodes to perform cancellation as discussed above with respect to FIG. 17.

In some implementations, the objects shown in FIG. 18 communicate asynchronously. For this reason, the cancellation of the delivery is not only modeled in the delivery itself but also in the sales order (e.g., the predecessor). For this, a 1:1 cardinality between the Delivery Cancellation status at the sales order and the delivery is needed. This is achieved by modeling the status at a sales order node that has a 1:1 cardinality to the delivery (e.g., the item node in the example shown in FIG. 18).

Due to the asynchronous communication between sales order and delivery, the cancellation request from sales order to delivery is now an intermediate step with a finite life time that is explicitly modeled at the sales order using the cancellation pattern shown in FIG. 9.

The cancellation of a sales order works as follows. The execution of the request cancellation action 1825 changes the cancellation status, but cannot execute the cancellation immediately. After saving, a process agent sends a cancellation request to all attached deliveries. The process agent notes this in the sales order items by calling the notify cancellation request action 1856. Once a delivery cancellation is either successful or discarded, a message is sent back to the sales order and the status at the corresponding item is set. This status information is then aggregated to the sales order root node 1810. Once all deliveries are cancelled, the sales order cancellation can be completed. If at least one delivery could not be cancelled, the sales order cancellation has to be discarded. This pattern models a two-step cancellation that can be declined.

Figure 19:
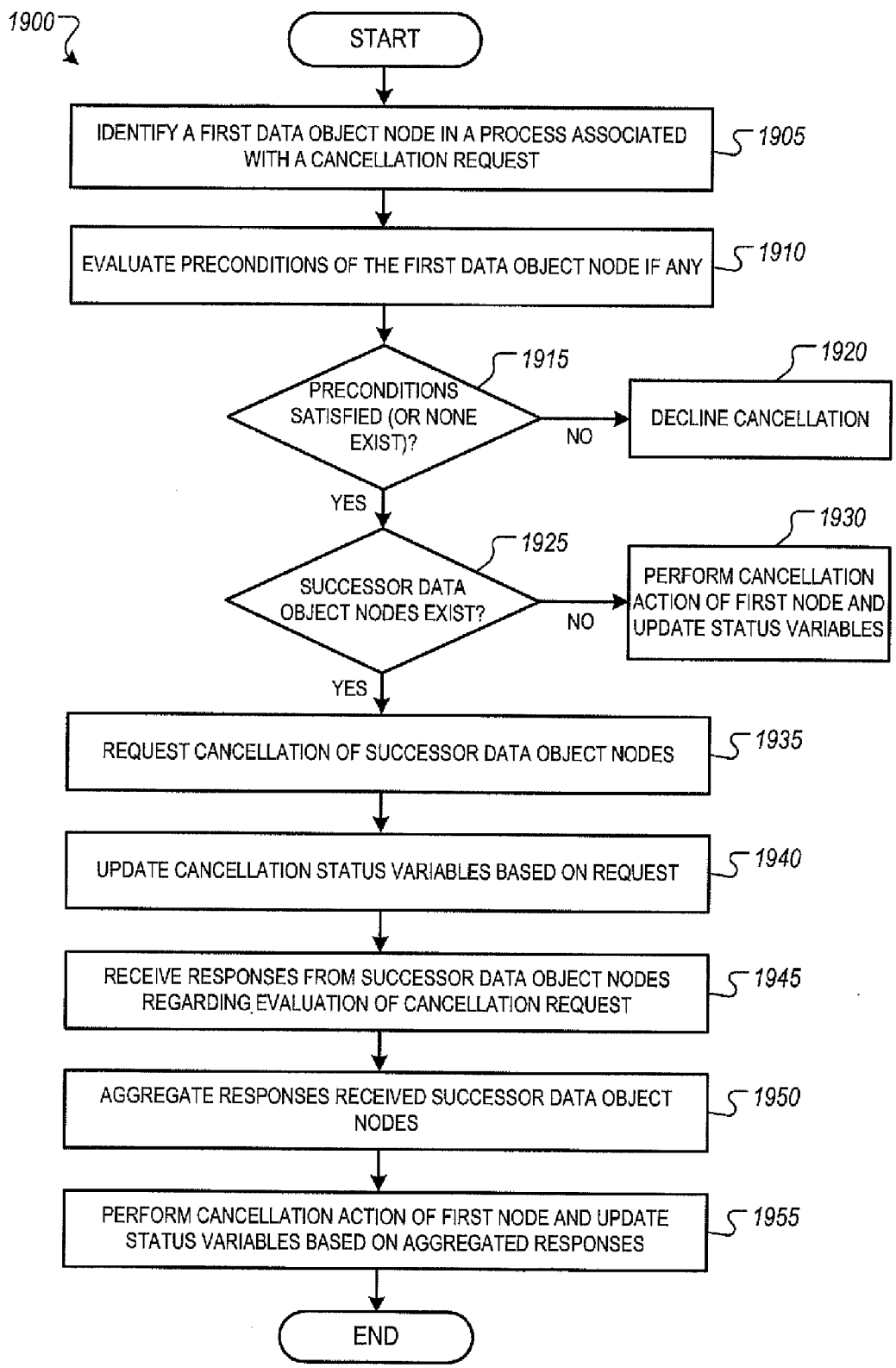
FIGS. 19 and 20 are flow charts of example processes for applying a status schema model including a cancellation building block to an instance of a corresponding data object node instance.

FIG. 19 illustrates an example process 1900 for applying a status schema model including a cancellation building block to an instance of a corresponding data object node instance. The example process 1900 may be an implementation of the application step 1030 described previously with respect to FIG. 10. The process may be implemented in computer-readable medium that is executed by, for example, a processor of the processing computer system 210 described previously with respect to FIG. 4.

The process 1900 begins when the processor implementing the process 1900 identifies a first data object node in a process associated with a cancellation request (step 1905). For instance, the processor identifies a highest level data object node (e.g., a parent object node) associated with the process being cancelled. In the example of canceling a sales order described throughout, the processor may identify the sales order root node.

The processor evaluates preconditions of the first data object node if any exist (step 1910). For example, the processor checks one or more cancellation status values in the first data object node that are preconditions to an action that is part of the cancellation process. The processor also may check one or more status values related to other status variables included in the status schema for the first data object node to determine whether an action that is part of the cancellation process is allowed.

Based on the evaluation, the processor determines whether all preconditions of the first data object node are satisfied or whether no preconditions exist (step 1915). When the processor determines that all preconditions of the first data object node are not satisfied, the processor declines the cancellation request (step 1920) and the process ends. When the processor determines that all preconditions of the first data object node are satisfied or that no preconditions exist, the processor determines whether successor (e.g., child) data object nodes exist for the first data object node (step 1925). For instance, the processor analyzes the status schema model for the first data object node to determine whether any successor (e.g., child) data object nodes exists and need to be accounted for in the cancellation process.

When the processor determines that no successor (e.g., child) data object nodes exist, the processor performs a cancellation action for the first data object node and updates the cancellation status variable of the first data object node (step 1930). For example, the processor performs a cancellation action defined by the cancellation building block integrated in the status schema for the first data object node and updates the cancellation status variable to a value of cancelled.

When the processor determines that successor (e.g., child) data object nodes do exist, the processor requests cancellation of successor data object nodes (step 1935) and updates cancellation status variables based on request (step 1940). For instance, the processor sends a cancellation message to each of the successor data object nodes to cause each of the successor data object nodes to invoke a cancellation action. After (or concurrently with) sending the cancellation messages, the processor updates the cancellation status variable of the first data object node to a value of cancellation requested.

The processor receives responses from the successor data object nodes regarding evaluation of the cancellation request (step 1945). For example, the processor receives, from each of the successor data object nodes, a response indicating whether or not cancellation of the successor data object node was successful.

The processor aggregates the responses received from the successor data object nodes (step 1950) and performs a cancellation action for the first data object node and updates cancellation status variables based on the aggregated responses (step 1955). For instance, when the processor determines that the aggregated responses all indicate that cancellation was successful, the processor performs a complete cancellation action defined by the cancellation building block integrated in the status schema for the first data object node and updates the cancellation status variable to a value of cancelled. When the processor determines that one or more of the aggregated responses indicate that cancellation was unsuccessful, the processor may perform a discard cancellation action defined by the cancellation building block integrated in the status schema for the first data object node and may update the cancellation status variable to a value of cancellation discarded. Alternatively, when the processor determines that one or more of the aggregated responses indicate that cancellation was unsuccessful and that one or more of the aggregated responses indicate that cancellation was successful, the processor may perform a partially-completed cancellation action defined by the cancellation building block integrated in the status schema for the first data object node and may update the cancellation status variable to a value of partially cancelled.

Figure 20:
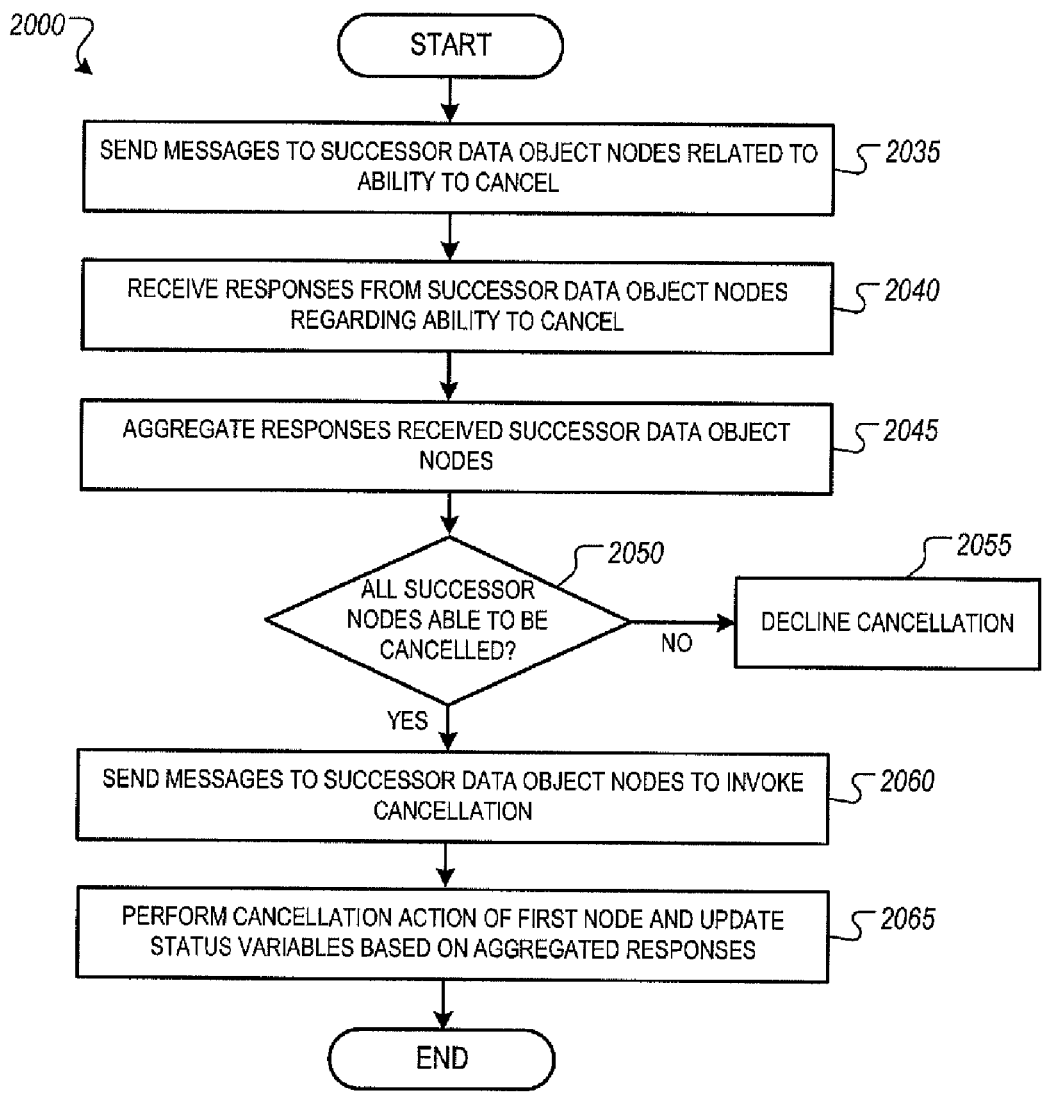

FIG. 20 illustrates another example process 2000 for applying a status schema model including a cancellation building block to an instance of a corresponding data object node instance. The example process 2000 illustrates an example that occurs when successor data object nodes exist. The example process 200 also may include the steps 1905 to 1930 described above with respect to FIG. 19. The example process 2000 may be an implementation of the application step 1030 described previously with respect to FIG. 10. The process may be implemented in computer-readable medium that is executed by, for example, a processor of the processing computer system 210 described previously with respect to FIG. 4.

When the processor determines that successor (e.g., child) data object nodes do exist for a first data object node in a process associated with a cancellation request, the processor sends messages to the successor data object nodes related to ability to cancel (step 2035). For example, the processor sends a message to each of the successor data object nodes asking whether the corresponding successor data object node is in a state that enables cancellation. In this example, the message merely asks whether the successor data object node can be cancelled and does not invoke a cancellation action at the successor data object node.

The processor receives responses from the successor data object nodes regarding ability to cancel (step 2040). For example, the processor receives, from each of the successor data object nodes, a response indicating whether or not cancellation of the successor data object node is possible given the state of the successor data object node.

The processor aggregates the responses received from the successor data object nodes (step 2045) and determines whether all of the successor data object nodes are able to be cancelled (step 2050). When all of the successor data object nodes are not able to be cancelled (e.g., at least one successor data object node cannot be cancelled), the processor declines the cancellation request (step 2055). In some examples, the processor does not cancel any of the first data object node or successor data object nodes and updates a cancellation status variable to a value of cancellation discarded to indicate that cancellation was attempted, but was not successful.

When all of the successor data object nodes are able to be cancelled, the processor sends messages to the successor data object nodes to invoke cancellation (step 2060) and performs a cancellation action for the first data object node and updates cancellation status variables based on the aggregated responses (step 2065). For instance, the processor performs a complete cancellation action defined by the cancellation building block integrated in the status schema for the first data object node and updates the cancellation status variable to a value of cancelled. The messages sent to the successor data object nodes cause all of the successor data object nodes to be cancelled.

Figure 21:
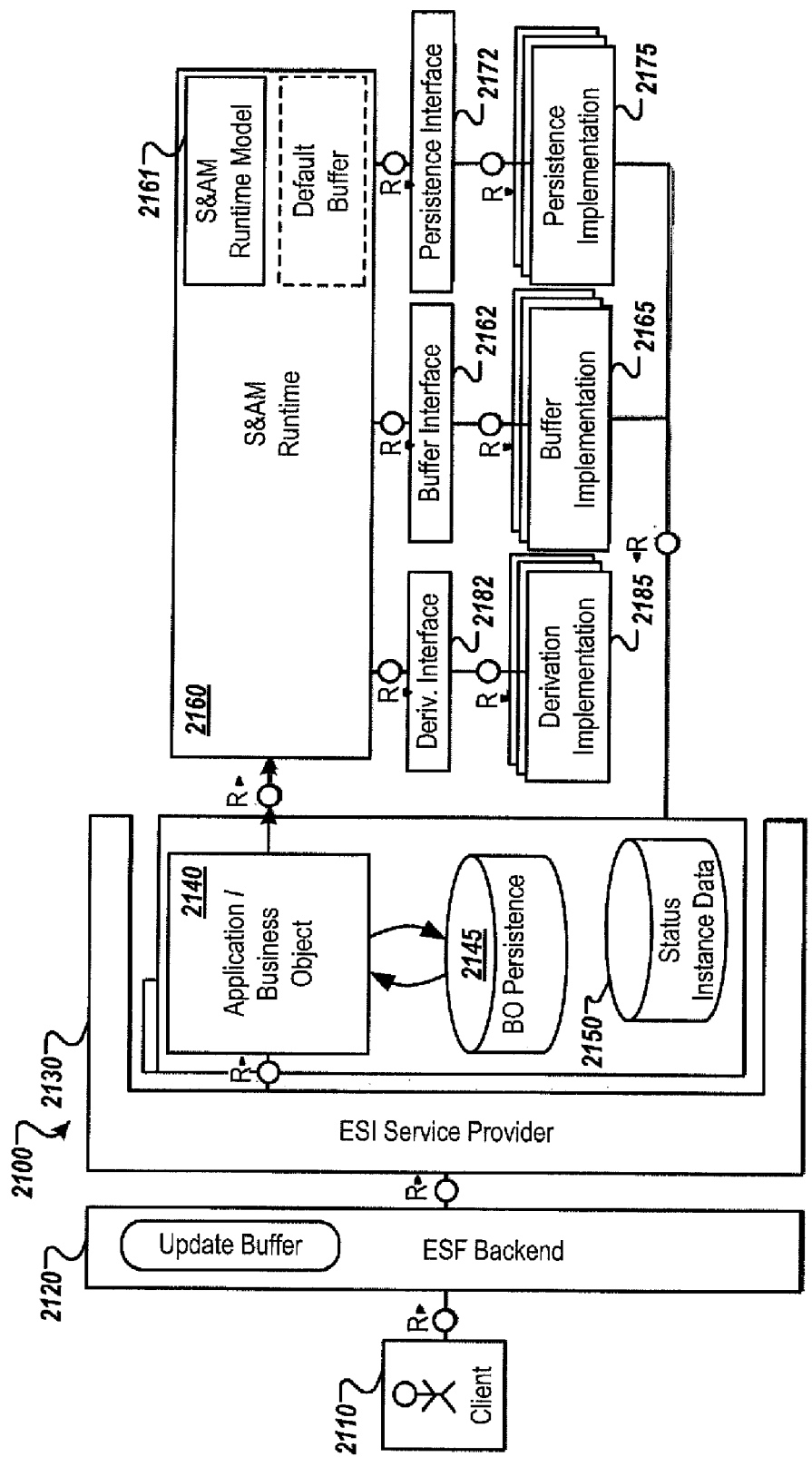
FIG. 21 is a block diagram of an example runtime architecture for status management.

FIG. 21 depicts an example of a runtime architecture 2100 for status management within an enterprise services implementation. In general, the runtime architecture 2100 includes an enterprise services layer, an application layer, and a status management runtime layer. The entities in the status schemas correspond to external representations in the enterprise services layer. The application layer implements the services modeled in the enterprise services layer. To perform tasks related to status information (such as checking whether an action is allowed and setting a status value as a result of performing an action), the application layer uses the status and action management (S&AM) runtime component. The application layer also provides services to the status and action management runtime component, such as performing a process to determine status derivations or other inter-schema processes.

More particularly, a client 2110 accesses enterprise services externally provided to clients, which communicate with the enterprise services framework backend 2120, which, in turn, interfaces with the enterprise services provider interface 2130. The enterprise services provider interface 2130 addresses an application through application/business object 2140. The application layer also includes a repository of persistent business object instances 2145 and optionally a status instance data repository 2150. In some implementations, the business object instances include status variables, which are used to set status values in corresponding variables of status schema instances. Additionally or alternatively, an application layer may store status variables for business objects separately, for example, in a status instance data repository 2150. At runtime, the status schema instance is instantiated and status values set based on the current status values of status variables, whether the status variables are persistently stored with business objects or in a separate status repository. In some implementations, a status schema instance for a data node instance may be persistently stored and loaded into memory at runtime.

The application/business object 2140 accesses the status and action management runtime component 2160, which includes the status and action management runtime model 2161 having status schema models usable at runtime. The status and action management runtime component 2160 includes a buffer interface 2162 to a buffer implementation 2165, which is a runtime representation of status schema instances. The status and action management runtime component 2160 also includes a persistence interface 2172 to a persistence implementation 2175 of status schema instances. The persistence implementation 2175, for example, may map status tables (such as name-value pair tables) of the status and action management runtime component 2160 to the database tables of the application data. The status and action management runtime component 2160 optionally may include a derivation interface 2182 to a derivation implementation 2185. The derivation interface 2182 provides a standardized manner for the runtime component to access derivation processes, or other types of inter-schema processes.

Figure 22:
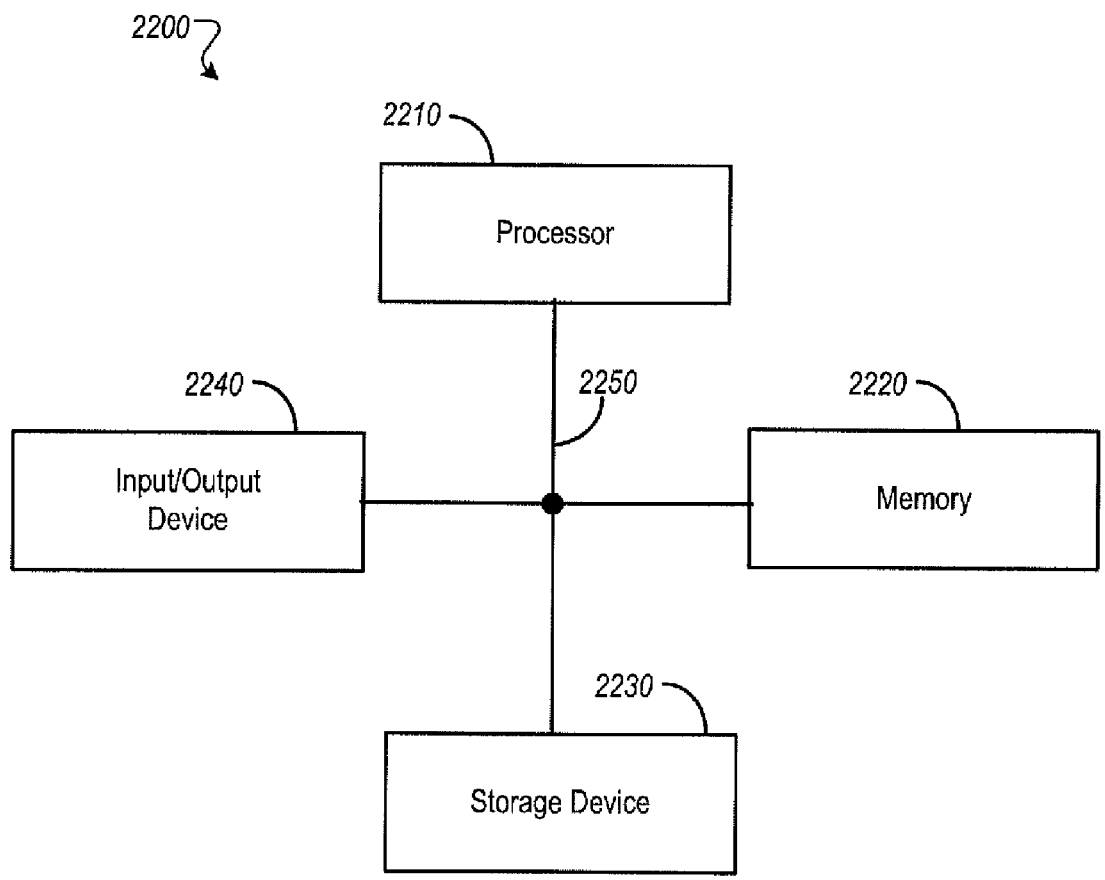
FIG. 22 is a block diagram of a computer system.

FIG. 22 is a block diagram of a computer system 2200 that can be used in the operations described above, according to one implementation. The system 2200 includes a processor 2210, a memory 2220, a storage device 2230 and an input/output device 2240. Each of the components 2210, 2220, 2230 and 2240 are interconnected using a system bus 2250. The processor 2210 is capable of processing instructions for execution within the system 2200. In some implementations, the processor 2210 is a single-threaded processor. In another implementation, the processor 2210 is a multi-threaded processor. The processor 2210 is capable of processing instructions stored in the memory 2220 or on the storage device 2230 to display graphical information for a user interface on the input/output device 2240.

The memory 2220 stores information within the system 2200. In one implementation, the memory 2220 is a computer-readable medium. In another implementation, the memory 2220 is a volatile memory unit. In still another implementation, the memory 2220 is a non-volatile memory unit.

The storage device 2230 is capable of providing mass storage for the system 2200. In one implementation, the storage device 2230 is a computer-readable medium. In various different implementations, the storage device 2230 may be a floppy disk device, a hard disk device, an optical disk device, or a tape device.

For example, the runtime processing component 220 discussed previously with respect to FIGS. 2 and 4 may include the processor 2210 executing computer instructions that are stored in one of memory 2220 and storage device 2230. In another example, the implementation of modeling computer system 450 described above with respect to FIG. 4 may include the computer system 2200.

The input/output device 2240 provides input/output operations for the system 2200. In one implementation, the input/output device 2240 includes a keyboard and/or pointing device. In another implementation, the input/output device 2240 includes a display unit for displaying graphical user interface as discussed above.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device, or in computer-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the disclosure by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

The techniques can be implemented in a distributed manner. For example, the functions of the input/output device 2240 may be performed by one or more computing systems, and the functions of the processor 2210 may be performed by one or more computing systems.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the disclosure, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations of the techniques have been described. Nevertheless, it will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A non-transitory computer-readable storage medium storing one or more programs, the one or more programs comprising instructions that, when executed, cause a runtime component to perform operations comprising:

receiving a request to cancel a parent data object node instance, the parent data object node instance being an instance of a first type of data object node and having a logical relationship to a child data object node instance;

in response to the request to cancel the parent data object node instance, accessing, for the parent data object node instance, a first cancellation building block that models a first cancellation subprocess for the first type of data object node and that is integrated in a first status schema defined for the first type of data object node, the first cancellation building block including a first cancellation status variable for the first type of data object node and a first cancellation action that defines the first cancellation subprocess for the first type of data object node; and executing cancellation of the parent data object node instance by:

accessing data that indicates whether or not the child data object node instance is able to be cancelled; and conditioned on the accessed data indicating that the child data object node instance is able to be cancelled, performing, for the parent data object node instance, the first cancellation action included in the first cancellation building block for the first type of data object node to update the first cancellation status variable included in the first cancellation building block.

2. The non-transitory computer-readable storage medium of claim 1 wherein the one or more programs further comprises instructions that, when executed, cause the runtime component to perform operations comprising, conditioned on the accessed data indicating that the child data object node instance is not able to be cancelled, declining the request to cancel the parent data object node instance.

3. The non-transitory computer-readable storage medium of claim 2:
wherein the first cancellation building block includes a cancellation-declined status variable for the first type of data object node; and
wherein declining the request to cancel the parent data object node instance comprises updating the cancellation-declined status variable for the parent data object node instance to indicate that cancellation of the parent data object node instance was attempted and declined.

4. The non-transitory computer-readable storage medium of claim 1:
wherein accessing data that indicates whether or not the child data object node instance is able to be cancelled comprises:
sending, from the parent data object node instance to the child data object node instance, a message that asks whether the child data object node instance is able to be cancelled; and
receiving, at the parent data object node instance from the child data object node instance, a response that indicates whether or not the child data object node instance is able to be cancelled, and
wherein performing, for the parent data object node instance, the first cancellation action is conditioned on the response indicating that the child data object node instance is able to be cancelled.

5. The non-transitory computer-readable storage medium of claim 4 wherein the one or more programs further comprises instructions that, when executed, cause the runtime component to perform operations comprising, based on a determination that the response indicates that the child data object node instance is able to be cancelled, sending, from the parent data object node instance to the child data object node instance, a request to invoke cancellation of the child data object node instance.

6. The non-transitory computer-readable storage medium of claim 1:
wherein accessing data that indicates whether or not the child data object node instance is able to be cancelled comprises:
sending, from the parent data object node instance to the child data object node instance, a request to invoke cancellation of the child data object node instance; and
receiving, at the parent data object node instance from the child data object node instance, a response that indicates whether or not the child data object node instance was cancelled in response to the request, and
wherein performing, for the parent data object node instance, the first cancellation action is conditioned on the response indicating that the child data object node instance was cancelled.

7. The non-transitory computer-readable storage medium of claim 6 wherein the first cancellation building block includes a cancellation-requested status variable for the first type of data object node and the one or more programs further comprises instructions that, when executed, cause the runtime component to perform operations comprising updating the cancellation-requested status variable for the parent data object node instance in response to sending the request to invoke cancellation of the child data object node instance.

8. The non-transitory computer-readable storage medium of claim 1 wherein the child data object node instance is an instance of a second type of data object node that is different than the first type of data object node.

9. The non-transitory computer-readable storage medium of claim 8 wherein accessing data that indicates whether or not the child data object node instance is able to be cancelled comprises:
accessing, for the child data object node instance, a second cancellation building block that models a second cancellation subprocess for the second type of data object node and that is integrated in a second status schema defined for the second type of data object node, the second cancellation building block including a second cancellation status variable for the second type of data object node and a second cancellation action that defines the second cancellation subprocess for the second type of data object node; and
determining whether the child data object node instance is able to be cancelled using the second cancellation building block that models the second cancellation subprocess for the second type of data object node and that is integrated in the second status schema defined for the second type of data object node.

10. The non-transitory computer-readable storage medium of claim 9 wherein the second cancellation building block is a variant of the first cancellation building block.

11. The non-transitory computer-readable storage medium of claim 9 wherein the second cancellation building block is the same as the first cancellation building block.

12. The non-transitory computer-readable storage medium of claim 9 wherein:
the child data object node instance has a logical relationship to a grandchild data object node instance,
the grandchild data object node instance is an instance of a third type of data object node that is different than the second type of data object node and the first type of data object node,
determining whether the child data object node instance is able to be cancelled comprises:
accessing information that indicates whether or not the grandchild data object node instance is able to be cancelled; and
determining that the child data object node instance is able to be cancelled is conditioned on the accessed information indicating that the grandchild data object node instance is able to be cancelled.

13. The non-transitory computer-readable storage medium of claim 12 wherein accessing data that indicates whether or not the grandchild data object node instance is able to be cancelled comprises:
accessing, for the grandchild data object node instance, a third cancellation building block that models a third cancellation subprocess for the third type of data object node and that is integrated in a third status schema defined for the third type of data object node, the third cancellation building block including a third cancellation status variable for the third type of data object node and a third cancellation action that defines the third cancellation subprocess for the third type of data object node, the third cancellation building block being a variant of the first cancellation building block and the second cancellation building block; and
determining whether the grandchild data object node instance is able to be cancelled using the third cancellation building block that models the third cancellation subprocess for the third type of data object node and that is integrated in the third status schema defined for the third type of data object node.

14. The non-transitory computer-readable storage medium of claim 1 wherein the child data object node instance is an instance of the first type of data object node.

15. The non-transitory computer-readable storage medium of claim 1 wherein the one or more programs further comprises instructions that, when executed, cause the runtime component to perform operations comprising controlling actions of the parent data object node instance based on an updated value of the first cancellation status variable.

16. The non-transitory computer-readable storage medium of claim 1 wherein the one or more programs further comprises instructions that, when executed, cause the runtime component to perform operations comprising using values of additional status variables defined by the first status schema as additional constraints on the first cancellation subprocess.

17. The non-transitory computer-readable storage medium of claim 1 wherein:
the first status schema defines preconditions to performing the first cancellation action; and
performing, for the parent data object node instance, the first cancellation action comprises:
evaluating the preconditions to performing the first cancellation action; and
performing, for the parent data object node instance, the first cancellation action conditioned on the evaluation of the preconditions revealing that cancellation is allowed for the parent data object node instance.

18. The non-transitory computer-readable storage medium of claim 1:
wherein the parent data object node instance has a logical relationship to multiple child data object node instances;
wherein accessing data that indicates whether or not the child data object node instance is able to be cancelled comprises:
sending a request related to cancellation to each of the multiple child data object node instances;
receiving, from each of the multiple child data object node instances, a response to the request related to cancellation; and
aggregating the responses received from the multiple child data object node instances, and
wherein performing, for the parent data object node instance, the first cancellation action is conditioned on the aggregated responses indicating that all of the multiple child data object node instances are able to be cancelled.

19. A computer-implemented method comprising:
receiving a request to cancel a parent data object node instance, the parent data object node instance being an instance of a first type of data object node and having a logical relationship to a child data object node instance;
in response to the request to cancel the parent data object node instance, accessing, for the parent data object node instance and from electronic storage, a first cancellation building block that models a first cancellation subprocess for the first type of data object node and that is integrated in a first status schema defined for the first type of data object node, the first cancellation building block including a first cancellation status variable for the first type of data object node and a first cancellation action that defines the cancellation subprocess for the first type of data object node; and
executing, by at least one processor, cancellation of the parent data object node instance by:
accessing data that indicates whether or not the child data object node instance is able to be cancelled; and
conditioned on the accessed data indicating that the child data object node instance is able to be cancelled, performing, for the parent data object node instance, the first cancellation action included in the first cancellation building block for the first type of data object node to update the cancellation status variable included in the first cancellation building block.

20. A non-transitory computer-readable storage medium storing one or more programs, the one or more programs comprising instructions that, when executed, cause a runtime component to perform operations comprising:
receiving a request to cancel a first data object node instance, the first data object node instance being an instance of a first data object node;
determining whether a successor data object node instance exists for the first data object node instance;
in response to a determination that a successor data object node instance does not exist, performing a cancellation process for the first data object node instance;
in response to a determination that a successor data object node instance exists:
accessing data that indicates whether or not the successor data object node instance is able to be cancelled;
conditioned on the accessed data indicating that the successor data object node instance is able to be cancelled, performing a cancellation process for the first data object node instance; and
conditioned on the accessed data indicating that the successor data object node instance is not able to be cancelled, declining the request to cancel the first data object node instance.

* * * * *